US011150787B2

(12) United States Patent
Olejniczak et al.

(10) Patent No.: US 11,150,787 B2
(45) Date of Patent: Oct. 19, 2021

(54) IMAGE DISPLAY DEVICE AND OPERATING METHOD FOR ENLARGING AN IMAGE DISPLAYED IN A REGION OF A DISPLAY AND DISPLAYING THE ENLARGED IMAGE VARIOUSLY

(71) Applicant: Samsung Electronics Co., Ltd., Suwon-si, Gyeonggi-do (KR)

(72) Inventors: Grzegorz Olejniczak, Luboń (PL); Tomasz Robert Gdala, Plewiska (PL); Do-hyoung Kim, Seoul (KR); Ju-yun Sung, Yongin-si (KR); Young-jun Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 15/163,183

(22) Filed: May 24, 2016

(65) Prior Publication Data
US 2017/0147174 A1    May 25, 2017

(30) Foreign Application Priority Data
Nov. 20, 2015    (KR) .................. 10-2015-0163341

(51) Int. Cl.
*G09G 5/00*    (2006.01)
*G06F 3/0484*    (2013.01)
(Continued)

(52) U.S. Cl.
CPC ........ *G06F 3/0484* (2013.01); *G06F 3/04817* (2013.01); *G06K 9/00228* (2013.01);
(Continued)

(58) Field of Classification Search
None
See application file for complete search history.

(56) References Cited

U.S. PATENT DOCUMENTS 5,754,348 A * 5/1998 Soohoo ................ G06T 3/0018
359/436
6,094,230 A    7/2000 Han
(Continued)

FOREIGN PATENT DOCUMENTS

CN    101247489 A    8/2008
CN    102106145 A    6/2011
(Continued)

OTHER PUBLICATIONS

European Search Report dated Sep. 24, 2018, issued in European Patent Application No. 16866512.3.
(Continued)

*Primary Examiner* — Anh-Tuan V Nguyen
(74) *Attorney, Agent, or Firm* — Jefferson IP Law, LLP

(57) ABSTRACT

An image display device including a display configured to display a first image is provided. The image display device includes a controller configured to generate a second image by enlarging a part of the first image displayed in a first region of the display and to control the display to display a part of the second image in the first region, and a sensor configured to sense a user input for moving the second image. In response to the user input, the controller is configured to control the display to move and display the second image, within the first region.

15 Claims, 39 Drawing Sheets

(51) Int. Cl.
*G06K 9/00* (2006.01)
*G06K 9/32* (2006.01)
*H04N 21/44* (2011.01)
*H04N 21/422* (2011.01)
*H04N 21/431* (2011.01)
*H04N 21/4223* (2011.01)
*G06F 3/0481* (2013.01)
*G06T 3/40* (2006.01)

(52) U.S. Cl.
CPC ..... *G06K 9/00724* (2013.01); *G06K 9/00731* (2013.01); *G06K 9/3233* (2013.01); *G06T 3/40* (2013.01); *H04N 21/422* (2013.01); *H04N 21/4223* (2013.01); *H04N 21/42203* (2013.01); *H04N 21/42204* (2013.01); *H04N 21/431* (2013.01); *H04N 21/4316* (2013.01); *H04N 21/44008* (2013.01); *G06F 2203/04805* (2013.01); *G06F 2203/04806* (2013.01)

(56) References Cited

U.S. PATENT DOCUMENTS

| | | | | |
|---|---|---|---|---|
| 6,144,378 A * | 11/2000 | Lee | ............... | G06F 3/0236 715/767 |
| 7,075,512 B1 * | 7/2006 | Fabre | ............... | G06F 3/0481 345/156 |
| 7,197,718 B1 * | 3/2007 | Westerman | ............... | G06F 3/0485 345/660 |
| 7,274,378 B2 * | 9/2007 | McAvoy | ............... | G06F 17/30241 345/629 |
| 7,554,581 B2 | 6/2009 | Kim | | |
| 7,847,792 B2 * | 12/2010 | Ketterer | ............... | G01R 1/025 324/76.11 |
| 8,365,074 B1 * | 1/2013 | Wagner | ............... | G06F 3/0488 345/661 |
| 8,570,391 B2 * | 10/2013 | Shimamura | ............... | G06K 9/00228 348/222.1 |
| 8,736,761 B2 | 5/2014 | Kendall et al. | | |
| 8,774,852 B2 | 7/2014 | Meshkati et al. | | |
| 8,863,041 B1 * | 10/2014 | Mendis | ............... | G06F 3/0484 715/863 |
| 9,141,250 B2 | 9/2015 | Choi et al. | | |
| 9,342,759 B1 * | 5/2016 | Chen | ............... | G06K 9/6262 |
| 9,648,269 B2 | 5/2017 | Park et al. | | |
| 9,779,287 B2 * | 10/2017 | Steinberg | ............... | G06K 9/00295 |
| 9,811,240 B2 | 11/2017 | Kim et al. | | |
| 2003/0025812 A1 * | 2/2003 | Slatter | ............... | H04N 5/23222 348/240.2 |
| 2004/0250216 A1 * | 12/2004 | Roman | ............... | G06F 3/0481 715/800 |
| 2005/0171926 A1 * | 8/2005 | Thione | ............... | G10L 15/22 |
| 2005/0251015 A1 * | 11/2005 | Takikawa | ............... | G06T 3/40 600/407 |
| 2005/0262447 A1 | 11/2005 | Shoemaker | | |
| 2006/0112334 A1 * | 5/2006 | Endrikhovski | ............... | G06F 3/013 715/700 |
| 2006/0244826 A1 * | 11/2006 | Chew | ............... | G01S 3/7865 348/143 |
| 2007/0083819 A1 * | 4/2007 | Shoemaker | ............... | G06T 3/0018 715/767 |
| 2007/0260994 A1 * | 11/2007 | Sciammarella | ............... | G06F 3/0482 715/769 |
| 2007/0288860 A1 * | 12/2007 | Ording | ............... | G06F 3/0482 715/779 |
| 2008/0024643 A1 * | 1/2008 | Kato | ............... | G06K 9/00255 348/333.01 |
| 2008/0034317 A1 * | 2/2008 | Fard | ............... | G06F 3/0481 715/781 |
| 2008/0168369 A1 * | 7/2008 | Tadman | ............... | G01C 21/343 715/764 |
| 2008/0170132 A1 * | 7/2008 | Yi | ............... | H04N 5/23212 348/222.1 |
| 2008/0175557 A1 | 7/2008 | Chung et al. | | |
| 2008/0198178 A1 * | 8/2008 | Julin | ............... | G06T 3/40 345/661 |
| 2008/0288888 A1 * | 11/2008 | Kahle | ............... | G03B 21/10 715/781 |
| 2009/0009652 A1 * | 1/2009 | Sudo | ............... | H04N 5/23293 348/349 |
| 2009/0058823 A1 * | 3/2009 | Kocienda | ............... | G06F 3/0236 345/173 |
| 2009/0132961 A1 * | 5/2009 | Baar | ............... | G06Q 30/02 715/810 |
| 2009/0207248 A1 * | 8/2009 | Cilia | ............... | H04N 19/17 348/143 |
| 2009/0240431 A1 * | 9/2009 | Chau | ............... | G01C 21/3647 701/532 |
| 2009/0254841 A1 * | 10/2009 | Balaishis | ............... | G06Q 40/06 715/753 |
| 2009/0313566 A1 * | 12/2009 | Vian | ............... | G06T 15/00 715/765 |
| 2009/0313584 A1 * | 12/2009 | Kerr | ............... | G06F 3/012 715/849 |
| 2010/0026721 A1 * | 2/2010 | Park | ............... | H04N 21/47 345/660 |
| 2010/0026723 A1 * | 2/2010 | Nishihara | ............... | G06F 3/04886 345/671 |
| 2010/0046840 A1 * | 2/2010 | Hashiguchi | ............... | G06K 9/00973 382/201 |
| 2010/0077304 A1 * | 3/2010 | Zaman | ............... | G06F 3/0481 715/702 |
| 2010/0150450 A1 * | 6/2010 | Tsuji | ............... | H04N 5/232 382/195 |
| 2010/0188579 A1 * | 7/2010 | Friedman | ............... | H04N 5/45 348/565 |
| 2010/0283800 A1 | 11/2010 | Cragun et al. | | |
| 2012/0002094 A1 | 1/2012 | Jelicz | | |
| 2012/0038676 A1 | 2/2012 | Malecki | | |
| 2012/0092253 A1 * | 4/2012 | Irani | ............... | G06F 1/1692 345/157 |
| 2012/0147246 A1 * | 6/2012 | Dent | ............... | H04N 1/0044 348/333.12 |
| 2012/0182316 A1 * | 7/2012 | Moha | ............... | G06F 17/30274 345/636 |
| 2012/0266069 A1 * | 10/2012 | Moshiri | ............... | H04N 5/4403 715/719 |
| 2012/0294496 A1 * | 11/2012 | Nakamoto | ............... | G06K 9/00288 382/118 |
| 2012/0329519 A1 * | 12/2012 | Bliss | ............... | G06F 3/0482 455/556.2 |
| 2013/0050131 A1 * | 2/2013 | Lee | ............... | G08G 1/09626 345/174 |
| 2013/0069946 A1 * | 3/2013 | Venon | ............... | A61B 5/00 345/428 |
| 2013/0156274 A1 * | 6/2013 | Buchmueller | ............... | G06Q 10/101 382/118 |
| 2013/0294642 A1 * | 11/2013 | Wang | ............... | G06K 9/00261 382/103 |
| 2013/0298083 A1 * | 11/2013 | Bertoldo | ............... | G06F 3/0482 715/835 |
| 2014/0002440 A1 * | 1/2014 | Lynch | ............... | G06T 19/00 345/419 |
| 2014/0118284 A1 * | 5/2014 | Tsang | ............... | G06F 17/242 345/173 |
| 2014/0129989 A1 * | 5/2014 | Kim | ............... | G06F 3/0482 715/838 |
| 2014/0173505 A1 * | 6/2014 | Urakawa | ............... | G06F 3/0488 715/784 |
| 2014/0195967 A1 | 7/2014 | Abe et al. | | |
| 2014/0195975 A1 * | 7/2014 | Kyoun | ............... | G06F 3/0482 715/825 |
| 2014/0208208 A1 * | 7/2014 | Chevallier | ............... | G11B 27/28 715/720 |
| 2014/0208277 A1 * | 7/2014 | Makino | ............... | G06F 3/0488 715/863 |
| 2014/0229891 A1 * | 8/2014 | O'Byrne | ............... | G06F 3/0484 715/790 |

(56) References Cited

U.S. PATENT DOCUMENTS

| | | | | |
|---|---|---|---|---|
| 2014/0313333 | A1* | 10/2014 | Le | B60R 16/0231 348/148 |
| 2014/0327757 | A1* | 11/2014 | Shen | G02B 21/368 348/79 |
| 2015/0146011 | A1* | 5/2015 | Tsubusaki | H04N 5/23296 348/169 |
| 2015/0212660 | A1* | 7/2015 | Su | G06F 9/4443 715/739 |
| 2015/0268822 | A1* | 9/2015 | Waggoner | G06F 3/04842 715/722 |
| 2015/0309565 | A1* | 10/2015 | Beri | G06F 3/013 715/776 |
| 2016/0048304 | A1* | 2/2016 | Niranjani | G06F 3/0482 715/800 |
| 2017/0052968 | A1* | 2/2017 | Stokes | G06F 16/9535 |

FOREIGN PATENT DOCUMENTS

| | | |
|---|---|---|
| CN | 104219552 A | 12/2014 |
| CN | 104360882 A | 2/2015 |
| EP | 2 811 753 A1 | 12/2014 |
| KR | 10-0253002 B1 | 4/2000 |
| KR | 10-2004-0093262 A | 11/2004 |
| KR | 10-0515959 B1 | 9/2005 |
| KR | 10-2006-0031959 A | 4/2006 |
| KR | 10-2012-0113926 A | 10/2012 |

OTHER PUBLICATIONS

Chinese Office Action dated Jan. 2, 2020, issued in Chinese Application No. 201680067907.7.

European Examination Report dated Feb. 11, 2021, issued in European Application No. 16 866 512.3-1216.

\* cited by examiner

IMAGE DISPLAY DEVICE AND OPERATING METHOD FOR ENLARGING AN IMAGE DISPLAYED IN A REGION OF A DISPLAY AND DISPLAYING THE ENLARGED IMAGE VARIOUSLY

CROSS-REFERENCE TO RELATED APPLICATION(S)

This application claims the benefit under 35 U.S.C. § 119(a) of a Korean patent application filed on Nov. 20, 2015 in the Korean Intellectual Property Office and assigned Serial number 10-2015-0163341, the entire disclosure of which is hereby incorporated by reference.

TECHNICAL FIELD

The present disclosure relates to an image display device and an operating method of the same. More particularly, the present disclosure relates to an image display device capable of efficiently enlarging a part of an image displayed on a display and an operating method of the same.

BACKGROUND

An image display device is, for example, a device having a function of displaying an image which is viewable by a user. The user may view a broadcast through the image display device. The image display device displays a broadcast selected by the user from among broadcast signals transmitted by broadcasting stations. There is a trend toward shifting from analog broadcasting to digital broadcasting, all over the world.

A digital broadcast denotes a broadcast through which digital video and audio signals are transmitted. Compared to an analog broadcast, a digital broadcast is robust to external noise, and thus has less data loss. Also, a digital broadcast is more advantageous in error correction, has a higher resolution, and provides a clearer image. Also, a digital broadcast is able to provide an interactive service unlike an analog broadcast.

Recently, smart televisions (TVs), which provide various types of content in addition to a digital broadcasting function, are being provided. A smart TV is not aimed at passively operating according to a selection of a user but is aimed at finding out and providing something wanted by a user without manipulation of the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image display device and method for enlarging an image displayed in a region of a display and displaying the enlarged image variously.

In accordance with an aspect of the present disclosure, an image display device is provided. The image display device includes a display configured to display a first image, a controller configured to generate a second image by enlarging a part of the first image displayed in a first region of the display and to control the display to display a part of the second image in the first region, and a sensor configured to sense a user input for moving the second image. In response to the user input, the controller is configured to control the display to move and display the second image, within the first region.

The sensor according to an embodiment may be configured to sense an arrow key input, and the controller may be configured to perform control so that the second image is moved in a direction corresponding to the sensed arrow key input and displayed.

The display according to an embodiment may display an icon representing a movable direction of the second image.

The sensor according to an embodiment may be configured to sense an input for zooming in or out the second image, and the controller may be configured to zoom in the second image in response to the sensed zoom-in input or to zoom out the second image in response to the sensed zoom-out input.

The controller according to an embodiment may be configured to detect an object of interest in the first image, and to set a region in which the detected object of interest is displayed as the first region.

The controller according to an embodiment may be configured to detect text in the first image, and to set a region in which the text is displayed as the first region.

In accordance with another aspect of the present disclosure, an image display device is provided. The image display device includes a display configured to display a first image including at least one object, a sensor configured to sense a user input for selecting an object of interest from among the at least one object, and a controller configured to detect the object of interest in the first image, to generate a second image by enlarging the detected object of interest, and to control the display to display the second image.

The controller according to an embodiment may be configured to detect the at least one object included in the first image and to perform control so that a candidate list including the detected at least one object is displayed on the display, and the user input may be an input for selecting the object of interest from among the at least one object included in the candidate list.

The controller according to an embodiment may be configured to adjust a magnification of the object of interest according to a size of the object of interest displayed on the display, and to enlarge the object of interest according to the adjusted magnification.

The controller according to an embodiment may be configured to control the display to display the object of interest without enlarging the object of interest when a size of the object of interest displayed on the display is equal to or larger than a threshold value.

The controller according to an embodiment may be configured to control the display to display the second image to overlap a region in which the object of interest is displayed.

In accordance with another aspect of the present disclosure, an operating method of an image display device is provided. The operating method includes displaying a first image on a display, generating a second image by enlarging a part of the first image displayed in a first region of the display, displaying a part of the second image in the first region, sensing a user input for moving the second image, and moving and displaying the second image in the first region in response to the user input.

The sensing of the user input according to an embodiment may include sensing an arrow key input, and the moving and displaying of the second image may include moving the second image in a direction corresponding to the sensed arrow key input and displaying the moved second image.

The operating method according to an embodiment may further include displaying an icon representing a movable direction of the second image.

The operating method according to an embodiment may further include sensing an input for zooming in or out the second image, and zooming in the second image in response to the sensed zoom-in input or zooming out the second image in response to the sensed zoom-out input.

The operating method according to an embodiment may further include detecting an object of interest in the first image, and setting a region in which the detected object of interest is displayed as the first region.

The detecting of the object of interest in the first image and the setting of the region in which the detected object of interest is displayed as the first region according to an embodiment may include detecting text in the first image, and setting a region in which the text is displayed as the first region.

In accordance with another aspect of the present disclosure, an operating method of an image display device is provided. The operating method includes displaying a first image including at least one object, sensing a user input for selecting an object of interest from among the at least one object, detecting the object of interest in the first image, generating a second image by enlarging the detected object of interest, and displaying the second image.

The operating method according to an embodiment may further include detecting the at least one object included in the first image and displaying a candidate list including the detected at least one object, and the user input may be an input for selecting the object of interest from among the at least one object included in the candidate list.

The operating method according to an embodiment may further include adjusting a magnification of the object of interest according to a size of the object of interest displayed on a display.

The operating method according to an embodiment may further include displaying the object of interest without enlarging the object of interest when a size of the object of interest included in the first image is equal to or larger than a threshold value.

The displaying of the second image according to an embodiment may include displaying the second image to overlap a region in which the object of interest is displayed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
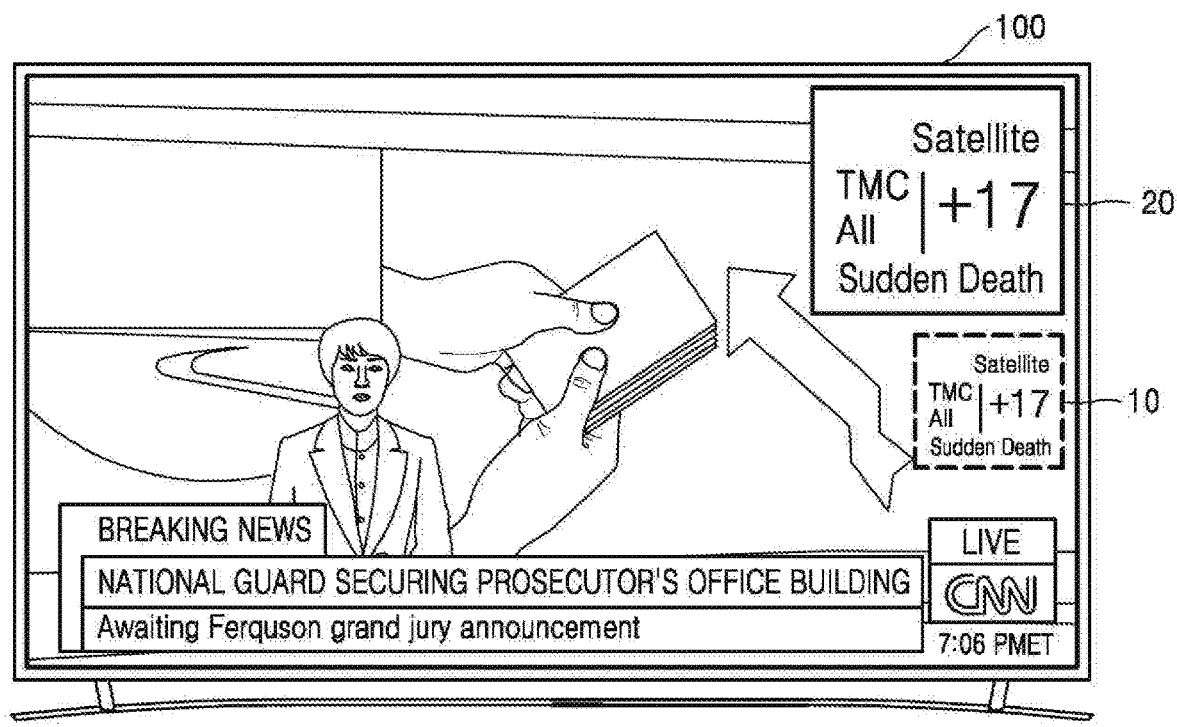
FIG. 1 is a diagram showing an image display device and a control device according to an embodiment of the present disclosure.
Figure 1:
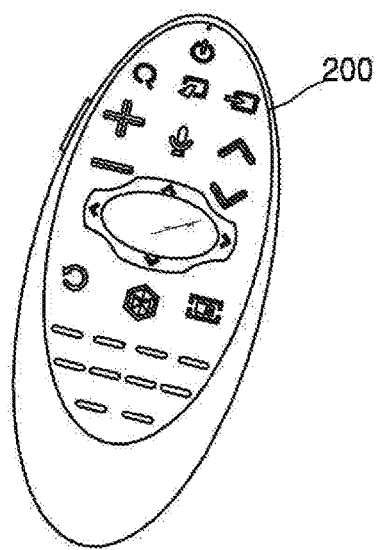

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, when a portion "includes" an element, unless otherwise described, another element may be further included, rather than the presence of other elements being excluded. Also, terms such as "portion," "module," etc. used herein indicate a unit for processing at least one function or operation, in which the unit and the block may be embodied as hardware or software or may be embodied by a combination of hardware and software.

Reference will now be made in detail to various embodiments, examples of which are illustrated in the accompanying drawings, wherein like reference numerals refer to like elements throughout. In this regard, the present various embodiments may have different forms and should not be construed as being limited to the descriptions set forth herein. Accordingly, the various embodiments are merely described below, by referring to the figures, to describe aspects. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram showing an image display device and a control device according to an embodiment of the present disclosure.

Referring to FIG. 1, an image display device 100 may be a television (TV). However, a TV is merely one embodiment, and the image display device 100 may be implemented as an electronic device including a display. For example, the image display device 100 may be implemented as a variety of electronic devices, such as a cellular phone, a tablet personal computer (PC), a digital camera, a camcorder, a laptop computer, a desktop, an electronic book (e-book) terminal, a digital broadcast terminal, a personal digital assistant (PDA), a portable multimedia player (PMP), a navigation device, a Moving Picture Experts Group phase 1 or phase 2 (MPEG-1 or MPEG-2) audio layer 3 (MP3) player, a wearable device, or so on. In particular, embodiments may be easily implemented in a display device having a large display, such as a TV, but are not limited thereto. Also, the image display device 100 may be a fixed type or a movable type, and may be a digital broadcast receiver capable of receiving digital broadcasts.

The image display device 100 may be implemented not only as a flat display device but also as a curved display device which is a screen having a curvature or a flexible display device whose curvature may be adjusted. The output resolution of the image display device 100 may include, for example, a high definition (HD) resolution, a full HD resolution, an ultra HD resolution, or a resolution higher than the ultra HD resolution.

A control device 200 may be implemented in various forms, such as a remote control or a cellular phone, for controlling the image display device 100.

Also, the control device 200 may control the image display device 100 using short-range communication including infrared (IR) and Bluetooth. The control device 200 may control functions of the image display device 100 using at least one of provided keys (including buttons), a touchpad, a microphone (not shown) capable of receiving the voice of a user, and a sensor (not shown) capable of recognizing a motion of the control device 200.

The control device 200 includes a power on/off button for turning on or off the power of the image display device 100. According to a user input, the control device 200 may change the channel of the image display device 100, adjust the volume, select terrestrial broadcasting/cable broadcasting/satellite broadcasting, or make a setting.

The control device 200 may include four arrow keys (or four arrow buttons). The four arrow keys may be used to direct upper, lower, left, and right movement. For example, when the input of any one of the four arrow keys is received, the image display device 100 may move a cursor in the corresponding direction.

The control device 200 may include at least one scroll key. The scroll key may be used to direct vertical or horizontal movement. For example, when an input for rolling the scroll key in any one direction is received, the image display device 100 may move the cursor in the corresponding direction.

Also, the control device 200 may be a pointing device. For example, when a particular key input is received, the control device 200 may operate as a pointing device. The image display device 100 may be controlled by a user input of moving the control device 200 up, down, left, or right or tilting the control device 200 in an arbitrary direction. Information on a motion of the control device 200 sensed by a sensor of the control device 200 may be transmitted to the image display device 100. The image display device 100 may calculate coordinates of the cursor on the display from the information on the motion of the control device 200, and move the cursor to correspond to the calculated coordinates. Accordingly, the cursor on the display of the image display device 100 may be moved or various displayed menus may be activated.

Alternatively, when the control device 200 includes a touch pad, the cursor on the display of the image display device 100 may be moved or various displayed menus may be selectively activated, according to a displacement value of an object, such as a finger of the user, moving on the touch pad.

In various embodiments of this specification, the term "user" denotes a person who controls a function or operation of the image display device 100 using the control device 200, and may include a viewer, a manager, and an installation engineer.

Meanwhile, the image display device 100 according to an embodiment may generate a second image by enlarging a part of a first image displayed in a first region 10 of the first image displayed on the display. Also, the image display device 100 may display the second image in a second region 20. Here, the second region 20 may be larger than the first region 10, and may overlap the first region 10. Alternatively, the first region 10 and the second 20 may be the same region. Alternatively, the second region 20 may be a fixed region irrespective of the position the first region 10.

Meanwhile, the first region 10 and the second region 20 according to an embodiment may be moved according to a user input. For example, the image display device 100 may set a part of an image to be enlarged by moving the first region 10 according to a user input. Also, the image display device 100 may set the position of a region in which an enlarged image is displayed by moving the second region 20 according to a user input.

Figure 2:
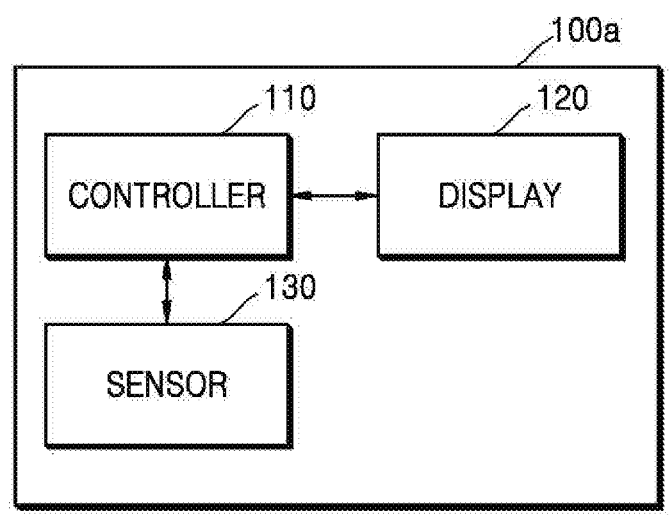
FIG. 2 is a block diagram showing a configuration of an image display device according to an embodiment of the present disclosure.

FIG. 2 is a block diagram showing a configuration of an image display device according to an embodiment of the present disclosure. An image display device 100a of FIG. 2 may be an embodiment of the image display device 100 of FIG. 1.

Referring to FIG. 2, the image display device 100a may include a controller 110, a display 120, and a sensor 130.

The display 120 generates a driving signal by converting a video signal, a data signal, an on-screen display (OSD) signal, a control signal, etc. processed by the controller 110. The display 120 may be implemented as a plasma display panel (PDP) display, a liquid crystal display (LCD), an organic light-emitting diode (OLED) display, a flexible display, etc., and may also be implemented as a three-dimensional (3D) display. Also, the display 120 may be configured as a touch screen and used as an input device as well as an output device.

The display 120 according to an embodiment may display a first image. Also, the display 120 may display a first region for setting a part of the first image to be enlarged. Further, the display 120 may display a second image obtained by enlarging the part of the first image displayed in the first region.

The sensor 130 according to an embodiment may sense a user input and transfer a sensed signal to the controller 110. Also, the sensor 130 may sense a user input for turning on/off the power, selecting a channel, moving the channel up/down, setting a screen, and so on. Also, the sensor 130 according to an embodiment may sense a user input for moving the region to be enlarged (first region) or a region showing the enlarged image (second region) in the image displayed on the display 120, a user input for moving a cursor, an input for moving the enlarged image (second image), an input for zooming in the second image, an input for zooming out the second image, a user input for selecting an object of interest among at least one object included in the first image, and so on.

The controller 110 according to an embodiment may process a video signal and input the processed video signal to the display 120. Accordingly, an image corresponding to the video signal may be displayed on the display 120. Also, the controller 110 may control the image display device 100a by a user instruction sensed by the sensor 130 or an internal program.

For example, according to an embodiment, the controller 110 may generate the second image by enlarging a part of the first image displayed in the first region of the display 120 and display a part of the second image in the first region.

Also, the controller 110 may perform control so that the second image is moved and displayed in the first region according to a sensed user input. Also, the controller 110 may perform control so that the second image is moved in a direction corresponding to a sensed input of an arrow key and displayed. Further, the controller 110 may zoom in the second image according to a sensed zoom-in input, or zoom out the second image according to a sensed zoom-out input.

The controller 110 may detect the object of interest in the first image, and generate the second image by enlarging the detected object of interest.

The controller 110 may detect the at least one object included in the first image, and control the display 120 to display a candidate list including the detected at least one object thereon.

The controller 110 may adjust a magnification of the object of interest according to the size of the displayed object of interest, and enlarge the object of interest according to the adjusted magnification.

When the size of the object of interest displayed on the display 120 is equal to or larger than a threshold value, the controller 110 may control the display 120 to display the object of interest without enlarging the object of interest.

The controller 110 may control the display 120 to display the second image obtained by enlarging the object of interest to overlap a region in which the object of interest is displayed.

Figure 3:
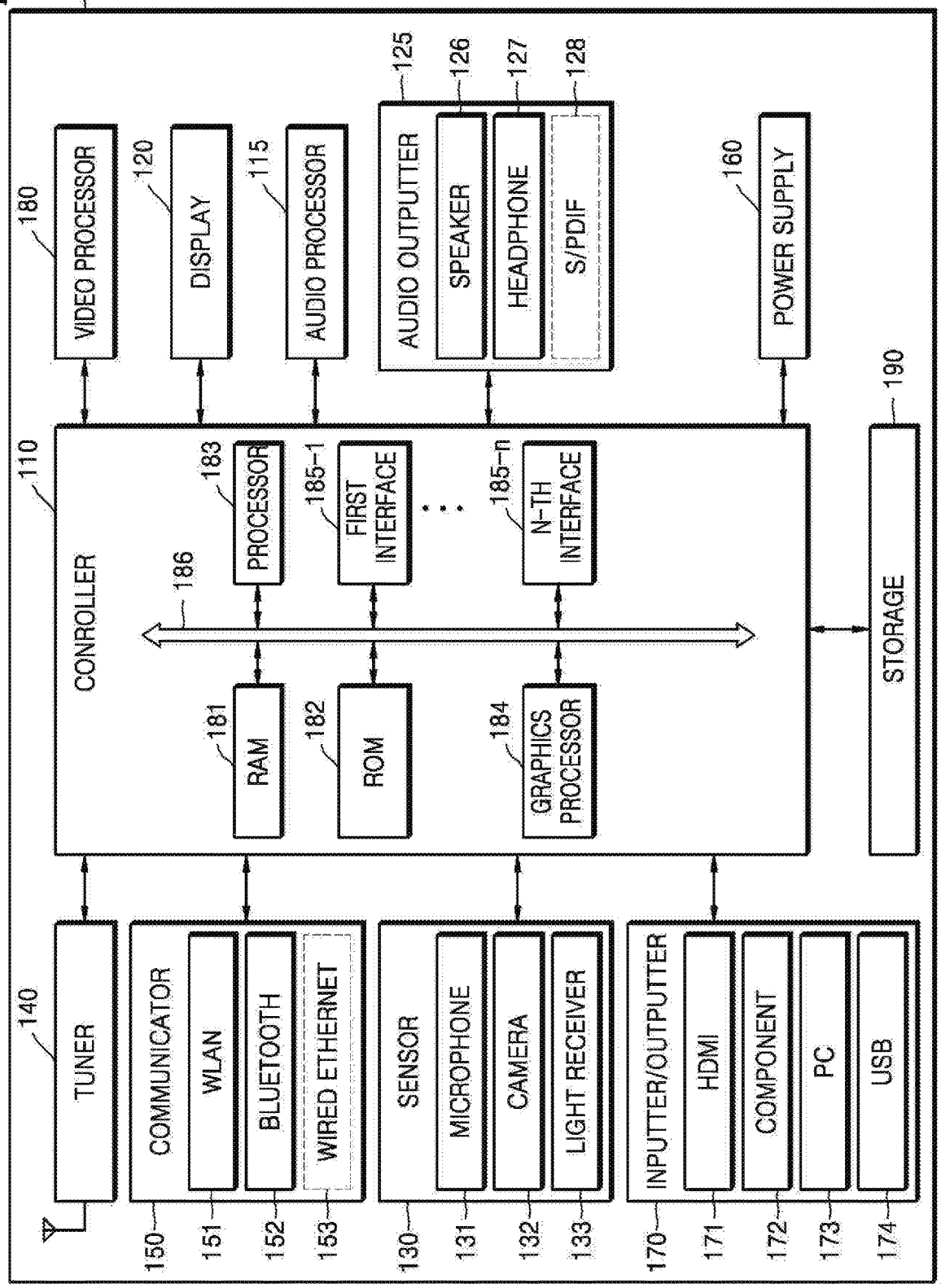
FIG. 3 is a block diagram showing a configuration of an image display device according to an embodiment of the present disclosure.

FIG. 3 is a block diagram showing a configuration of an image display device according to an embodiment of the present disclosure. An image display device 100b of FIG. 3 may be an embodiment of the image display device 100 of FIG. 1.

Referring to FIG. 3, in addition to a controller 110, a display 120, and a sensor 130, the image display device 100b according to an embodiment may include a video processor 180, an audio processor 115, an audio outputter 125, a power supply 160, a tuner 140, a communicator 150, an inputter/outputter 170, and a storage 190.

Regarding the controller 110, the display 120, and the sensor 130 of FIG. 3, the same description as made with reference to FIG. 2 will be omitted.

The video processor 180 processes video data received by the image display device 100b. The video processor 180 may perform various types of image processing, such as decoding, scaling, noise filtering, frame rate conversion, resolution conversion, etc., on the video data.

The display 120 displays a video included in a broadcast signal received through the tuner 140 on the screen. Also, the display 120 may display content (e.g., a moving image) input through the communicator 150 or the inputter/outputter 170. The display 120 may output an image stored in the storage 190. Further, the display 120 may display a voice user interface (UI) (e.g., including a voice command guide) for performing a voice recognition task corresponding to voice recognition, or a motion UI (e.g., including a user motion guide for motion recognition) for performing a motion recognition task corresponding to motion recognition.

The audio processor 115 processes audio data. The audio processor 115 may perform various types of processing, such as decoding, amplification, noise filtering, etc., on audio data. Meanwhile, the audio processor 115 may have a plurality of audio processing modules to process audio corresponding to a plurality of pieces of content.

The audio outputter 125 outputs audio included in the broadcast signal received through the tuner 140. The audio outputter 125 may output audio (e.g., voice and sound) input through the communicator 150 or the inputter/outputter 170. Also, the audio outputter 125 may output audio stored in the storage 190. The audio outputter 125 may include at least one of a speaker 126, a headphone output terminal 127, and a Sony/Philips digital interface (S/PDIF) output terminal 128. The audio outputter 125 may include a combination of the speaker 126, the headphone output terminal 127, and the S/PDIF output terminal 128.

The power supply 160 supplies power input from an external power source to the components in the image display device 100b. Also, the power supply 160 may supply power output from one or more batteries (not shown) positioned in the image display device 100b to the internal components.

Through amplification, mixing, resonance, etc. of a broadcast signal received in a wired or wireless manner, the tuner 140 may select only a frequency of a channel that is intended to be received in the image display device 100b from among many radio wave components and may be tuned to the selected frequency. The broadcast signal includes audio, a video, and additional information (e.g., an electronic program guide (EPG)).

The tuner 140 may receive broadcast signals in a frequency band corresponding to a channel number (e.g., the cable broadcasting number "506") according to a user input (for example, a control signal received from the control device 200, e.g., an input of a channel number, a channel up/down input, and a channel input in an EPG screen).

The tuner 140 may receive broadcast signals from various sources, such as a terrestrial broadcast, a cable broadcast, a satellite broadcast, an Internet broadcast, and so on. The tuner 140 may also receive broadcast signals from a source, such as an analog broadcast, a digital broadcast, or so on. A broadcast signal received through the tuner 140 is decoded (e.g., audio decoding, video decoding, or additional information decoding) and split into audio, video, and/or additional information. The split audio, video, and/or additional information may be stored in the storage 190.

The tuner 140 of the image display device 100b may be one or plural in number. The tuner 140 may be implemented as one body (i.e., all-in-one) with the image display device 100b, as a separate device (e.g., a set-top box; not shown) having a tuner electrically connected to the image display device 100b, or as a tuner (not shown) connected to the input/output portion 170.

The communicator 150 may connect the image display device 100b to an external device (e.g., an audio device, etc.). The controller 110 may transmit and receive content to and from the external device connected through the communicator 150, download an application from the external device, or perform web browsing. The communicator 150 may include one of a wireless local area network (WLAN) module 151, a Bluetooth module 152, and a wired Ethernet module 153 corresponding to performance and the structure of the image display device 100b. Alternatively, the communicator 150 may include a combination of the WLAN module 151, the Bluetooth module 152, and the wired Ethernet module 153. The communicator 150 may receive a control signal of the control device 200. The control signal may be implemented as a Bluetooth type, a radio frequency (RF) signal type, or a Wi-Fi type.

In addition to Bluetooth, the communicator 150 may further include modules for other short-range communication schemes (e.g., near field communication (NFC; not shown) and Bluetooth low energy (BLE; not shown)).

The sensor 130 senses a voice, an image, or an interaction of a user.

A microphone 131 receives a voice uttered by the user. The microphone 131 may convert the received voice into an electrical signal and output the electrical signal to the controller 110. The user's voice may include, for example, speech corresponding to a menu or a function of the image display device 100b. As the recognition range of the microphone 131, about 4 m or less is recommended between the microphone 131 and the user, and the recognition range of the microphone 131 may vary according to the loudness of a user's voice and the surroundings (e.g., speaker sound and ambient noise).

According to an embodiment, the microphone 131 may receive the voice uttered by the user and output the received voice data to the controller 110 so that the controller 110 may use the voice data to determine the identity of the user who looks at the image display device 100b.

The microphone 131 may be implemented as one body with the image display device 100b or separately from the image display device 100b. The separately implemented microphone 131 may be electrically connected to the image display device 100b through the communicator 150 or the input/output portion 170.

Those of ordinary skill in the art will easily appreciate that the microphone 131 may be excluded according to performance and the structure of the image display device 100b.

A camera 132 receives a video (e.g., consecutive frames) corresponding to a motion of the user including a gesture within a recognition range of a camera. For example, the recognition range of the camera 132 may be a distance of about 0.1 m to about 5 m from the camera 132 to the user. A user motion may include a motion, etc. of a part of the user's body, for example, a face, a facial expression, a hand, a fist, or a finger of the user. Under control of the controller 110, the camera 132 may convert the received video into an electrical signal and output the electrical signal to the controller 110.

According to an embodiment, the camera 132 may photograph the face, etc. of the user who uses the image display device 100b and output the photographed face image to the controller 110 so that the controller 110 may use the face image to determine the identity of the user.

Using the recognition result of a received motion, the controller 110 may select a menu displayed in the image display device 100b or perform control corresponding to the motion recognition result. For example, the control corresponding to the motion recognition result may include channel adjustment, volume adjustment, indicator movement, and cursor movement.

The camera 132 may include a lens (not shown) and an image sensor (not shown). Using a plurality of lenses and image processing, the camera 132 may support optical zoom or digital zoom. The recognition range of the camera 132 may be variously set according to an angle of a camera and a condition of the surroundings. When the camera 132 includes a plurality of cameras, it is possible to receive a 3D still image or a 3D motion using the plurality of cameras.

The camera 132 may be implemented as one body with the image display device 100b or separately from the image display device 100b. An additional device (not shown) including the separated camera 132 may be electrically connected to the image display device 100b through the communicator 150 or the input/output portion 170.

Those of ordinary skill in the art will easily appreciate that the camera 132 may be excluded according to performance and the structure of the image display device 100b.

A light receiver 133 receives an optical signal (including a control signal) from the external control device 200 through a light-receiving window (not shown) in a bezel of the display 120 or so on. The light receiver 133 may receive an optical signal corresponding to a user input (e.g., a touch, a press, a touch gesture, a voice, or a motion) from the control device 200. The control signal may be extracted from the received optical signal.

The inputter/outputter 170 receives a video (e.g., a moving image, etc.), audio (e.g., voice, music, etc.), additional information (e.g., an EPG, etc.), etc. from the outside of the image display device 100b. The inputter/outputter 170 may include one of a high-definition multimedia interface (HDMI) port 171, a component jack 172, a PC port 173, and a universal serial bus (USB) port 174. The inputter/outputter 170 may include a combination of the HDMI port 171, the component jack 172, the PC port 173, and the USB port 174.

Those of ordinary skill in the art will easily appreciate that the configuration and operation of the inputter/outputter 170 may be variously implemented according to embodiments of the present disclosure.

The controller 110 functions to control the overall operation of the image display device 100b and signal flow between internal components of the image display device 100b, and to process data. When there is an input of the user or a condition which has been set and stored in advance is satisfied, the controller 110 may execute an operating system (OS) and various applications stored in the storage 190.

The controller 110 may include a random access memory (RAM) 181 which stores a signal or data input from the outside of the image display device 100b or is used as a storage area corresponding to various tasks performed in the image display device 100b, a read-only memory (ROM) 182 for storing a control program for control for the image display device 100b, and a processor 183.

The processor 183 may include a graphics processing unit (GPU; not shown) for graphics processing corresponding to a video. The processor 183 may be implemented as a system on chip (SoC) in which a core (not shown) and the GPU (not shown) are integrated. The processor 183 may include a single core, a dual-core, a triple-core, a quad-core, or a core which is a multiple thereof.

The processor 183 may include a plurality of processors. For example, the processor 183 may be implemented as a main processor (not shown) and a sub-processor (not shown) operating in a sleep mode.

A graphics processor 184 generates a screen including a variety of objects, such as icons, images, text, etc., using a calculator (not shown) and a rendering portion (not shown). The calculator calculates attribute values, such as the coordinate values, the shape, the size, the color, etc. with which each object will be displayed according to the layout of the screen, using a user input sensed through the sensor 130. The rendering portion generates screens of various layouts including objects based on the attribute values calculated by the calculator. The screens generated by the rendering portion are displayed in the display region of the display 120.

First to n-th interfaces 185-1 to 185-n are connected to the various components described above. One of the interfaces 185-1 to 185-n may be a network interface connected to an external device through a network.

The RAM 181, the ROM 182, the processor 183, the graphics processor 184, and the first to n-th interfaces 185-1 to 185-n may be connected to each other through an internal bus 186.

In this embodiment, the term "controller of an image display device" includes the processor 183, the ROM 182, and the RAM 181.

The storage 190 may store various types of data, programs, or applications for operating and controlling the image display device 100b. The storage 190 may store input or output signals or data corresponding to operation of the video processor 180, the display 120, the audio processor 115, the audio outputter 125, the sensor 130, the tuner 140, the communicator 150, the power supply 160, and the inputter/outputter 170. The storage 190 may store a control program for controlling the image display device 100b and the controller 110, an application originally provided by a manufacturer or externally downloaded, a graphical user interface (GUI) related to an application, objects (e.g., image text, icons, buttons, etc.) for providing a GUI, user information, documents, databases (DBs), or related data.

In an embodiment, the term "storage" includes the storage 190, the ROM 182 and the RAM 181 of the controller 110, or a memory card (e.g., a micro secure digital (micro-SD) card or a USB memory (not shown)) installed in the image display device 100b. Also, the storage 190 may include a non-volatile memory, a volatile memory, a hard disk drive (HDD), or a solid-state drive (SSD).

Although not shown in the drawing, the storage 190 may include a broadcast receiving module, a channel control module, a volume control module, a communication control module, a voice recognition module, a motion recognition module, a light-receiving module, a display control module, an audio control module, an external input control module, a power control module, a power control module of an external device connected in a wireless manner (e.g., Bluetooth), a voice DB, or a motion DB. The modules and DBs of the storage 190 not shown in the drawing may be implemented in the form of software for the image display device 100b to perform a broadcast reception control function, a channel control function, a volume control function, a communication control function, a voice recognition function, a motion recognition function, a light reception control function, a display control function, an audio control function, an external input control function, a power control function, or a power control function of an external device connected in a wireless manner (e.g., Bluetooth). The controller 110 may perform each function using the software stored in the storage 190.

The image display device 100b including the display 120 may be electrically connected to an additional external device (e.g., a set-top box; not shown) having a tuner. For example, the image display device 100b may be implemented as an analog TV, a digital TV, a 3D TV, a smart TV, an LED TV, an OLED TV, a plasma TV, a monitor, etc., but those of ordinary skill in the art will easily appreciate that the image display device 100b is not limited thereto.

The image display device 100b may include a sensor (e.g., a luminance sensor, a temperature sensor, etc.; not shown) for sensing an internal or external state of the image display device 100b.

Meanwhile, the block diagrams of the image display devices 100a and 100b shown in FIGS. 2 and 3 are block diagrams for an embodiment. Respective components of the block diagrams may be integrated, added, or omitted according to the specifications of the image display devices 100a and 100b implemented in practice. In other words, as the occasion demands, two or more components may be combined into one component, or one component may be divided into two or more components. Also, functions performed by each block are intended for description of embodiments, and detailed operations or devices thereof do not limit the scope of the present disclosure.

Figure 4:
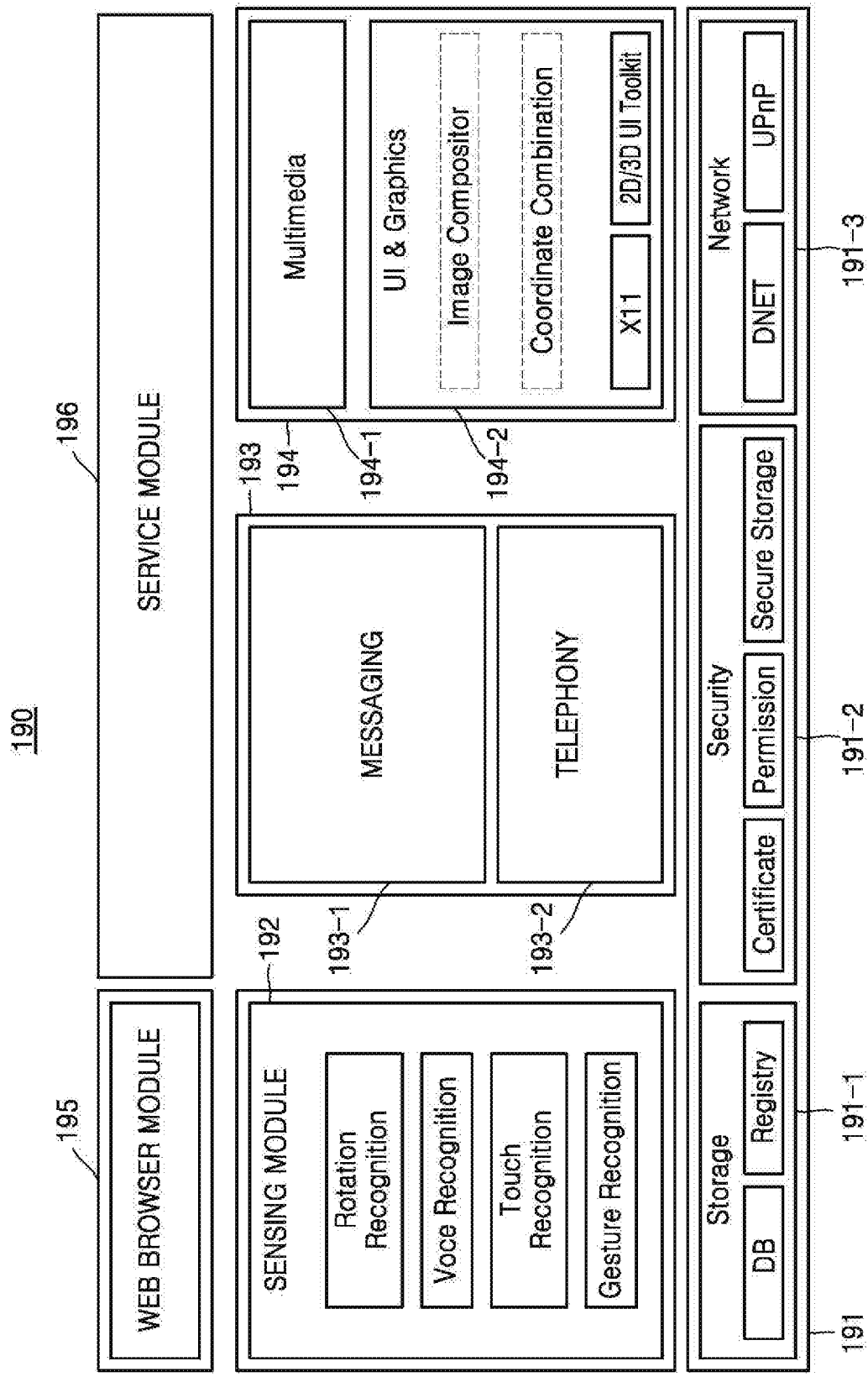
FIG. 4 is a diagram illustrating a configuration of software stored in a storage of FIG. 3 according to an embodiment of the present disclosure.

FIG. 4 is a diagram illustrating a configuration of software stored in the storage 190 of FIG. 3 according to an embodiment of the present disclosure.

Referring to FIG. 4, the storage 190 may store software including a base module 191, a sensing module 192, a communication module 193, a presentation module 194, a web browser module 195, and a service module 196.

The base module 191 denotes a basic module which processes a signal transferred from each piece of hardware included in the image display device 100 and transfers the processed signal to an upper layer module. The base module 191 includes a storage module 191-1, a security module 191-2, a network module 191-3, and so on. The storage module 191-1 is a program module which manages a DB or a registry. The processor 183 may access a DB in the storage using the storage module 191-1 and read out various types of data. The security module 191-2 is a program module which supports certification, permission, secure storage, etc. of hardware. The network module 191-3 is a module for supporting a network connection, including a DNET module, a universal plug and play (UPnP) module, and so on.

The sensing module 192 is a module which aggregates information from various types of sensors and analyzes and manages the aggregated information. The sensing module 192 may include a head direction recognition module, a face recognition module, a voice recognition module, a motion recognition module, an NFC recognition module, and so on.

The communication module 193 is a module which performs communication with the outside. The communication module 193 may include a messaging module 193-1 including a messenger program, a short message service (SMS) and multimedia message service (MMS) program, an e-mail program, etc., and a telephony module 193-2 including a call info aggregator program module, a voice over Internet protocol (VoIP) module, and so on.

The presentation module 194 is a module for configuring a display screen. The presentation module 104 includes a multimedia module 194-1 for playing and outputting multimedia content and a UI rendering module 194-2 for performing UI and graphics processing. The multimedia module 194-1 may include a player module, a camcorder module, a sound processing module, and so on. Accordingly, the multimedia module 194-1 performs an operation of reproducing various types of multimedia content to generate and reproduce a picture and sound. The UI rendering module 194-2 may include an image compositor module which combines images, a coordinate combination module which generates an image by combining coordinates on a screen on which the image will be displayed, an X11 module which receives various events from hardware, a two-dimensional (2D)/3D UI toolkit which provides a tool for configuring a 2D or 3D UI, and so on.

The web browser module 195 denotes a module which performs web browsing to access a web server. The web browser module 195 may include various modules, such as a web view module which configures a web page, a download agent module which performs downloading, a bookmark module, a Webkit module, and so on.

The service module 196 is a module including various applications for providing various services. In detail, the service module 196 may include various program modules, such as a social networking service (SNS) program, a content playback program, a game program, an electronic book (e-book) program, a calendar program, an alarm management program, other widgets, and so on.

FIG. 4 shows various program modules, but some of the various program modules shown in the drawing may be omitted, modified, or added according to the type and characteristics of the image display device 100. For example, the service module 196 may be implemented by further including a location-based module which supports a location-based service by operating in conjunction with hardware, such as a global positioning system (GPS) chip.

Figure 5:
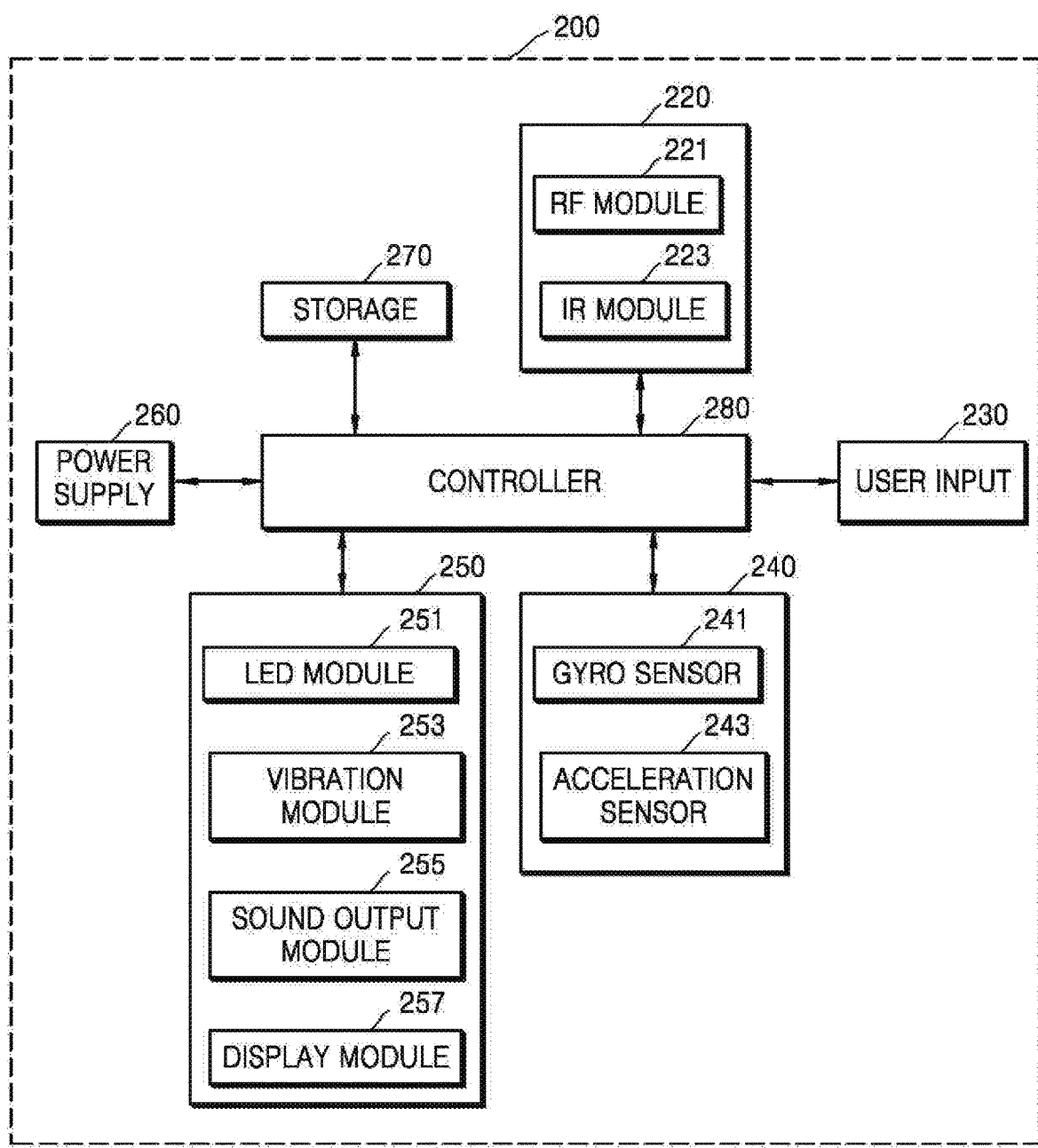
FIG. 5 is a block diagram showing a configuration of a control device according to an embodiment of the present disclosure.

FIG. 5 is a block diagram showing a configuration of a control device according to an embodiment of the present disclosure.

Referring to FIG. 5, the control device 200 may include a wireless communicator 220, a user input portion 230, a sensor 240, an output portion 250, a power supply 260, a storage 270, and a controller 280.

The wireless communicator 220 may transmit and receive signals to and from any one of the image display devices according to the various embodiments described above. The wireless communicator 220 may have an RF module 221 which may transmit and receive signals to and from the image display device 100 according to an RF communication standard. Also, the control device 200 may have an IR module 223 which may transmit and receive signals to and from the image display device 100 according to an IR communication standard.

In this embodiment, the control device 200 transmits a signal containing information on a motion, etc. of the control device 200 to the image display device 100 through the RF module 221.

The control device 200 may receive a signal transmitted by the image display device 100 through the RF module 221. Also, as occasion demands, the control device 200 may transmit a command for power on/off, channel change, volume change, etc. to the image display device 100 through the IR module 223.

The user input portion 230 may be configured with a keypad, buttons, a touch pad, a touch screen, or so on. The user may input a command related to the image display device 100 to the control device 200 by manipulating the user input portion 230. When the user input portion 230 has a hard key button, the user may input a command related to the image display device 100 to the control device 200 through an action of pushing the hard key button. When the user input portion 230 has a touch screen, the user may input a command related to the image display device 100 to the control device 200 by touching a soft key of the touch screen.

For example, the user input portion 230 may include four arrow buttons or four arrow keys. The four arrow buttons or keys may be used to control a window, a region, an application, or an item displayed on the display 120. The four arrow keys or buttons may be used to direct upper, lower, left, and right movement. Those of ordinary skill in the art may appreciate that the user input portion 230 may include two arrow buttons or two arrow keys instead of the four arrow buttons or the four arrow keys.

The user input portion 230 may have various types of input portions, such as a scroll key, a jog key, etc., which may be manipulated by the user.

The user input portion 230 may include a touch pad. The user input portion 230 according to an embodiment may receive a dragging, touching, or flipping user input through the touch pad of the control device 200. Also, according to the type of the received user input (e.g., a direction in which a drag command is input, or a time period in which a touch command is input), the image display device 100 may be controlled.

The sensor 240 may have a gyro sensor 241 or an acceleration sensor 243. The gyro sensor 241 may sense information on a motion of the control device 200. For example, the gyro sensor 241 may sense information on the motion of the control device 200 with respect to x, y, and z axes. The acceleration sensor 243 may sense information on a moving speed, etc. of the control device 200. Meanwhile, the sensor 240 may further include a distance measuring sensor, with which it is possible to sense a distance from the image display device 100.

The output portion 250 may output a video or audio signal corresponding to the manipulation of the user input portion 230 or a signal received from the image display device 100. Through the output portion 250, the user may be aware of whether or not the user input portion 230 has been manipulated or whether or not the image display device 100 has been controlled.

For example, the output portion 250 may include an LED module 251 which illuminates when the user input portion 230 is manipulated or signals are transmitted and received to and from the image display device 100 through the wireless communicator 220, a vibration module 253 which causes vibrations, a sound output module 255 which outputs sound, and a display module 257 which outputs an image.

The power supply 260 supplies power to the control device 200. When the control device 200 is not moved for a certain time, the power supply 260 may stop power supply, thereby reducing waste of power. When a certain key provided in the control device 200 is manipulated, the power supply 260 may resume power supply.

The storage 270 may store various types of programs, application data, etc. for control or operation of the control device 200.

The controller 280 performs overall control to control of the control device 200. The controller 280 may transmit a signal corresponding to the manipulation of a certain key on the user input portion 230 or a signal corresponding to the motion of the control device 200 sensed by the sensor 240 to the image display device 100 through the wireless communicator 220.

The image display device 100 may include a coordinate value calculator (not shown) which may calculate coordinate values of the cursor corresponding to the motion of the control device 200.

The coordinate value calculator (not shown) may correct a hand tremor or an error in a signal corresponding to the sensed motion of the control device 200 to calculate coordinate values (x, y) of the cursor to be displayed on the display 120.

A transmission signal of the control device 200 sensed through the sensor 130 is transmitted to the controller 110 of the image display device 100. The controller 110 may identify information on an operation of the control device 200 and manipulation of a key on the control device 200 from the signal transmitted by the control device 200, and accordingly, control the image display device 100.

In another example, the control device 200 may calculate coordinate values of the cursor corresponding to the operation and transmit the coordinate values to the image display device 100. In this case, the image display device 100 may transmit information on the received coordinate values to the controller 110 without a hand tremor or error correction process.

FIGS. 6A to 6D are diagrams showing an example in which a second image obtained by enlarging a part of a first image displayed in a first region of a display is displayed according to an embodiment of the present disclosure.

Figure 6A:
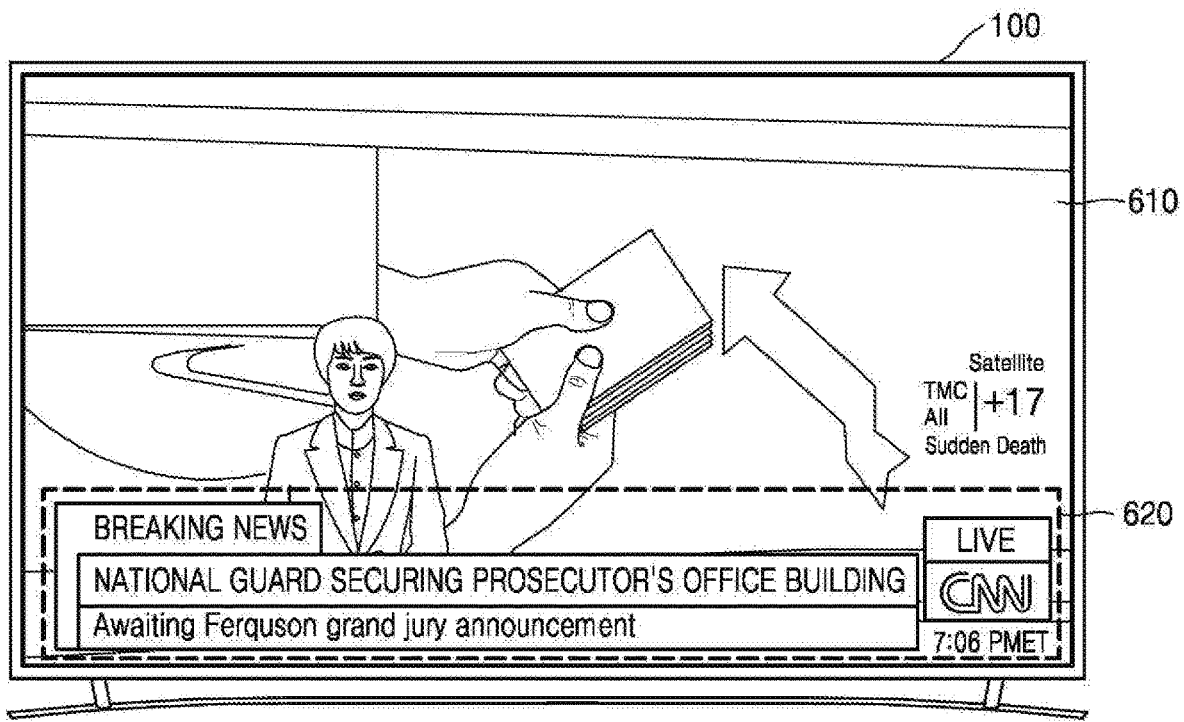
FIGS. 6A to 6D are diagrams showing an example in which a second image obtained by enlarging a part of a first image displayed in a first region of a display is displayed according to an embodiment of the present disclosure.
Figure 6A:
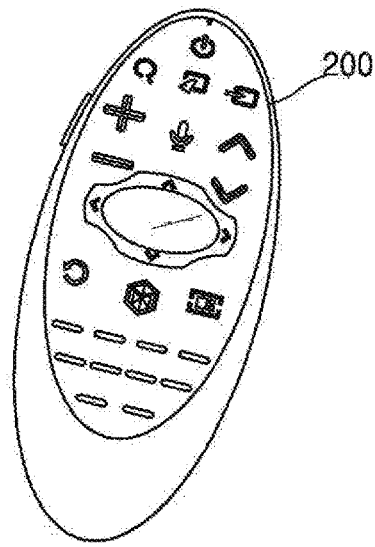

Referring to FIG. 6A, the display 120 may display a first image 610. Also, a first region 620 of the display 120 may be a region set as a zoom region. The first region 620 may be set by a user input. Alternatively, the controller 110 may detect an object of interest in the first image 610 and set a region in which the detected object of interest is displayed as the first region 620. For example, the controller 110 may detect text in the first image 610 and set a region in which the text is displayed as the first region 620.

The image display device 100 according to an embodiment may sense an input for enlargement. For example, the image display device 100 may sense an input of pushing a particular key included in the control device 200 as an input for enlargement. Also, the image display device 100 may sense an input of touching the touch pad included in the control device 200 or a drag input on the touch pad as an input for enlargement. Further, the image display device 100 may sense an input of rolling the scroll key included in the control device 200 in one direction as an input for enlargement. However, an input for enlargement is not limited thereto.

Figure 6B:
Figure 6B:
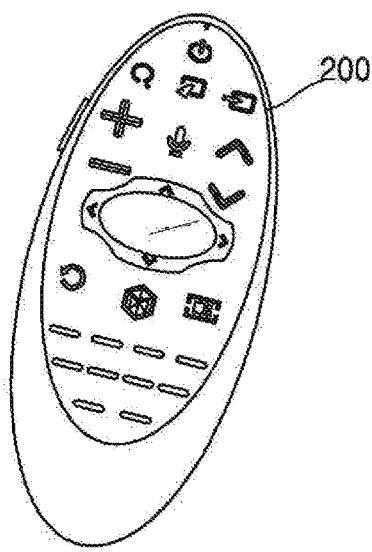

Meanwhile, referring to FIG. 6B, when an input for enlargement is sensed, the image display device 100 may generate a second image by enlarging a part of the first image 610 and display a part of the second image in the first region 620. Here, as an image obtained by enlarging the part of the first image 610, the second image is larger than the part of the first image 610, and only a part of the second image may be shown in the first region 620.

In addition, the display 120 may display an icon indicating a movable direction of the second image in the first region 620. Here, the icon may indicate that there remains a non-shown part of the second image in the corresponding direction. For example, as shown in FIG. 6B, triangle icons 630 indicating that the second image is movable upward, downward, leftward, and rightward may be displayed. However, the icons 630 are not limited thereto and may have a variety of shapes and sizes. Also, the shapes and sizes of the icons 630 may be variously set based on a user input.

The image display device 100 may sense a user input for moving the second image, and move and display the second image in the first region 620.

Figure 6C:
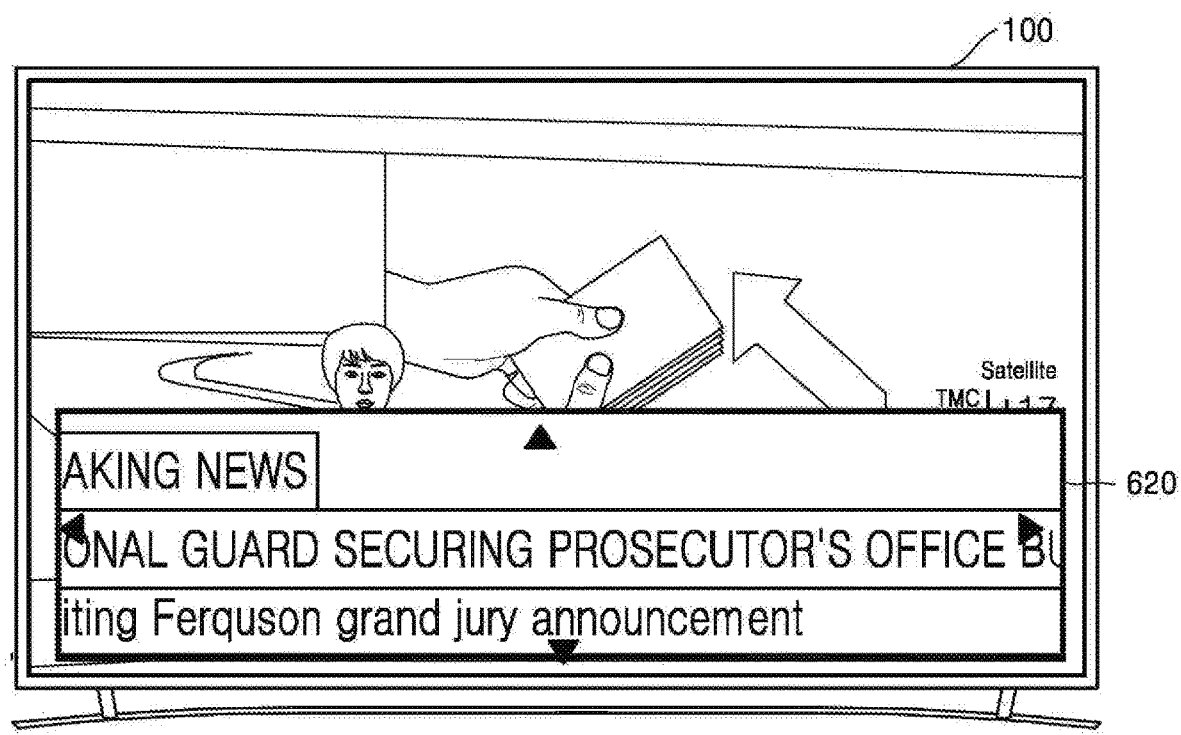
Figure 6C:
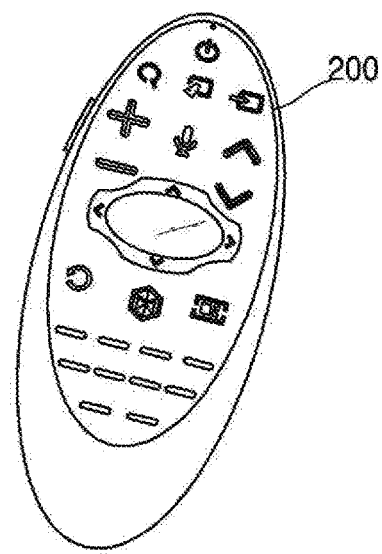

For example, when an input of any one arrow key among the four arrow keys included in the control device 200 is received, the image display device 100 may move the second image in a direction corresponding to the received input of the arrow key. When an input of the right key (an input of pushing the right key) is received, the image display device 100 may move the second image to the left (in a direction opposite to right) and display the second image as shown in FIG. 6C. However, the movement of the second image is not limited thereto, and the second image may be moved to the right in response to the input of the right key. In addition to inputs of the four arrow keys, user inputs for moving the second image may include a scroll key input, a touch input, inputs of moving the control device 200 upward, downward, leftward, and rightward, and so on.

Figure 6D:
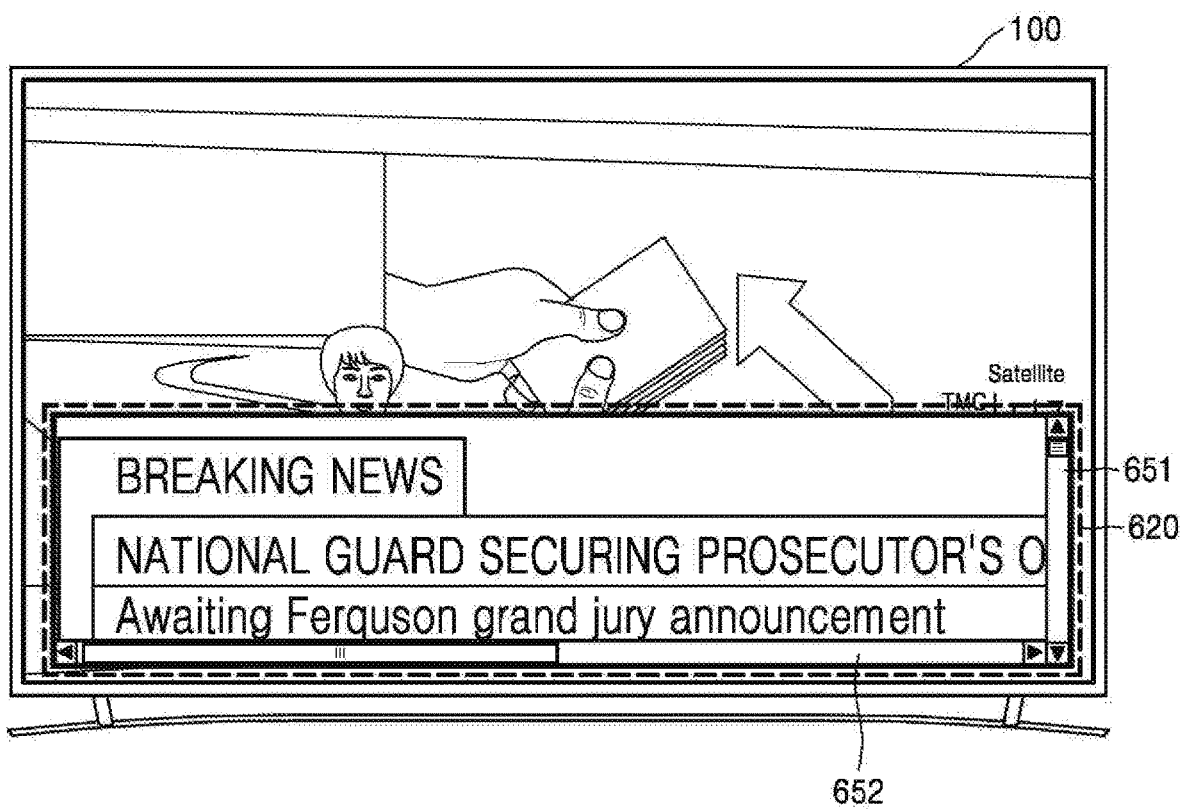
Figure 6D:
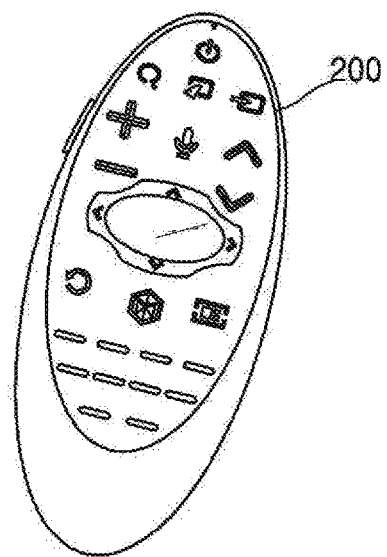

Referring to FIG. 6D, the display 120 may display a vertical scroll bar 651 on the right side of the first region 620, and display a horizontal scroll bar 652 at the bottom. The vertical scroll bar 651 and the horizontal scroll bar 652 may display where a part of the second image currently displayed in the first region 620 is positioned in the whole second image. The image display device 100 may receive an input of the up key or the down key among the four arrow keys included in the control device 200 to move a scroll box displayed in the vertical scroll bar 651 upward or downward, and may move the second image upward or downward accordingly. Also, the image display device 100 may receive an input of the left key or the right key among the four arrow keys to move a scroll box displayed in the horizontal scroll bar 652 leftward or rightward, and may move the second image leftward or rightward accordingly. However, the movement of the second image is not limited thereto, and the second image may be moved using an input of rolling the scroll key upward or downward, an input of rolling the scroll key leftward or rightward, an input of dragging a scroll box, etc. in addition to inputs of the four arrow keys.

Figure 7A:
FIGS. 7A to 7C are diagrams showing an example in which an image obtained by enlarging a whole image displayed on a display is displayed according to an embodiment of the present disclosure.
Figure 7A:
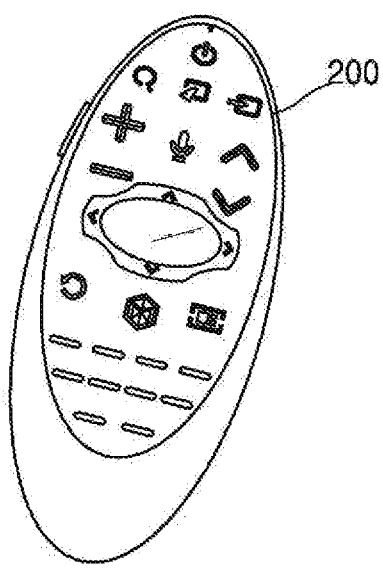
Figure 7B:
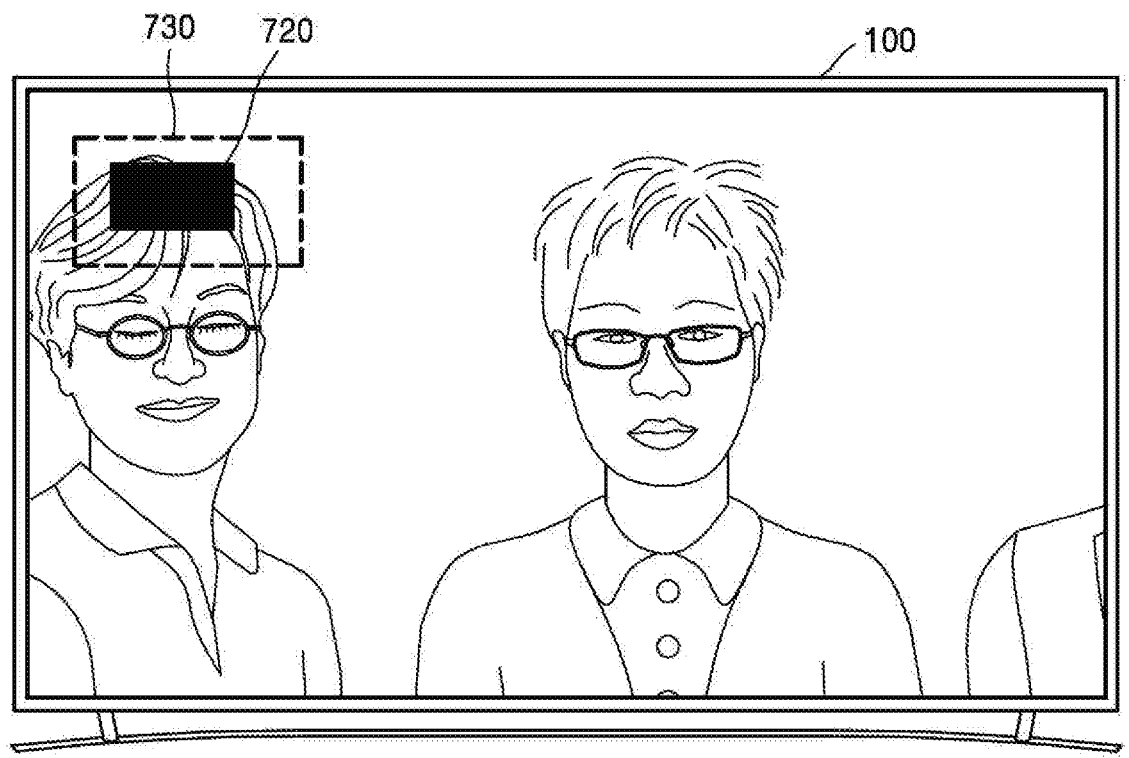
Figure 7B:
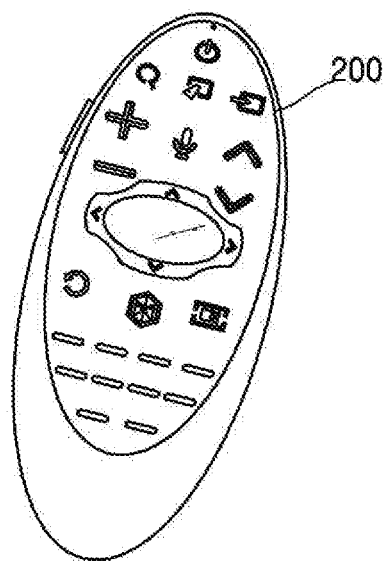
Figure 7C:
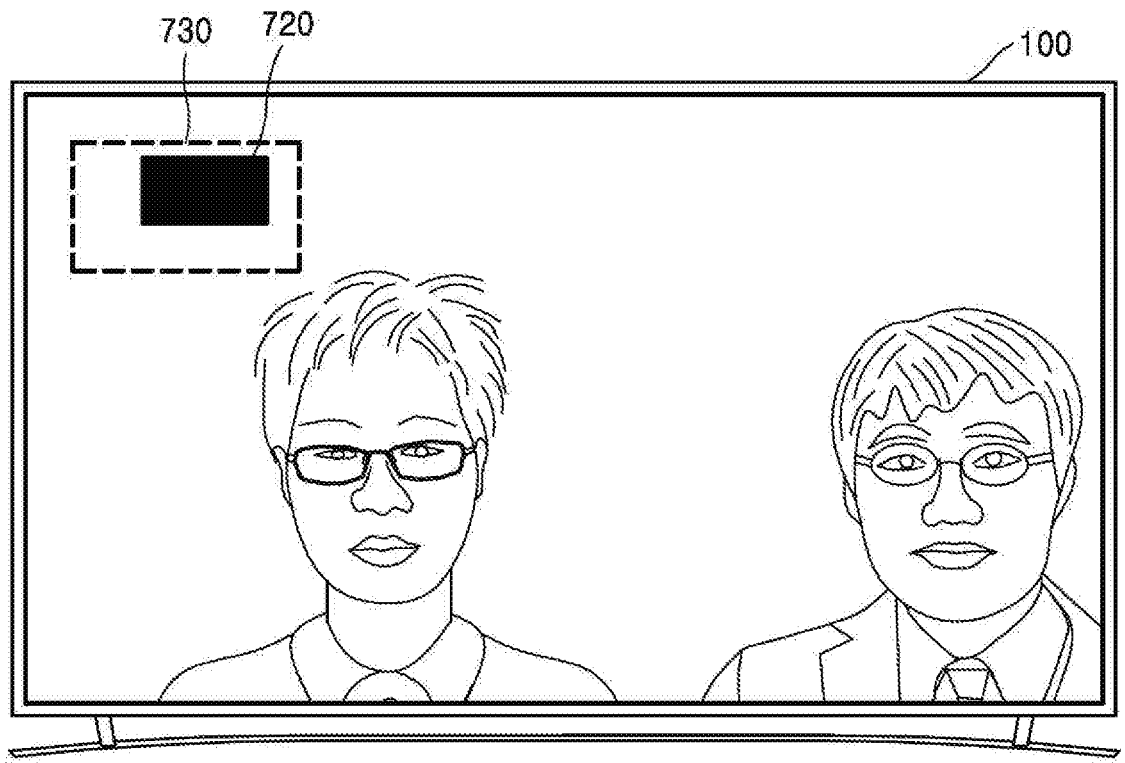
Figure 7C:
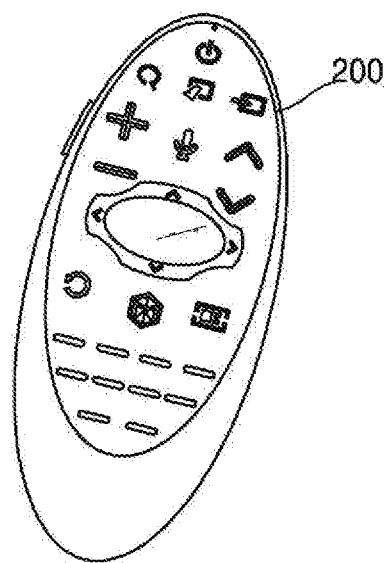

FIGS. 7A to 7C are diagrams showing an example in which an image obtained by enlarging a whole image displayed on a display is displayed according to an embodiment of the present disclosure.

Referring to FIG. 7A, the display 120 may display a second image, which is generated by enlarging a part of a first image (whole image) displayed in a first region, in the first region as described with reference to FIG. 6B.

The image display device 100 according to an embodiment may sense an input for overall enlargement. For example, the image display device 100 may sense an input of pushing a particular key included in the control device 200 as an input for overall enlargement. Also, the image display device 100 may sense an input of touching the touch pad included in the control device 200 or a drag input on the touch pad as an input for overall enlargement. Further, the image display device 100 may sense an input of rolling the scroll key included in the control device 200 in one direction as an input for enlargement. However, an input for overall enlargement is not limited thereto.

Meanwhile, referring to FIG. 7B, when an input for overall enlargement is sensed, the image display device 100 may enlarge the whole image displayed on the display 120 and display a part of the enlarged image. Also, in an upper left portion of the display 120, the display 120 may display an icon 720 indicating where the part of the enlarged image currently displayed in the display 120 is positioned in the whole enlarged image. For example, a rectangle 730 displayed with a dotted line represents the whole enlarged image, and the icon 720 represents the part of the enlarged image currently displayed on the display 120.

When a user input for moving the enlarged image is sensed while the part of the enlarged image is displayed, the image display device 100 may move and display the enlarged image in the display 120.

For example, when inputs of the right key and the up key among the four arrow keys included in the control device 200 are received, the image display device 100 may move the enlarged image to the lower left and display the enlarged image as shown in FIG. 7C. A method of moving an enlarged image has been described in detail with reference to FIG. 6C, and the same description will be omitted.

Figure 8A:
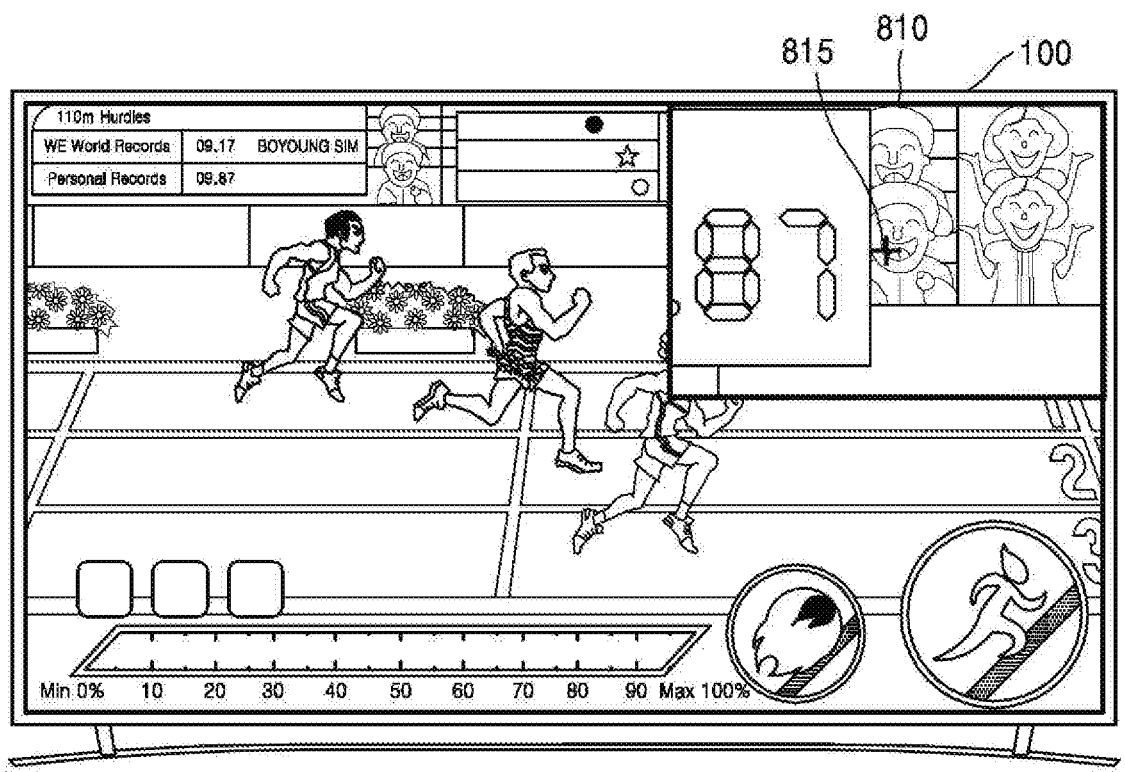
FIGS. 8A and 8B are diagrams showing an example in which a second image obtained by enlarging a part of a first image displayed in a first region of a display is displayed according to an embodiment of the present disclosure.
Figure 8A:
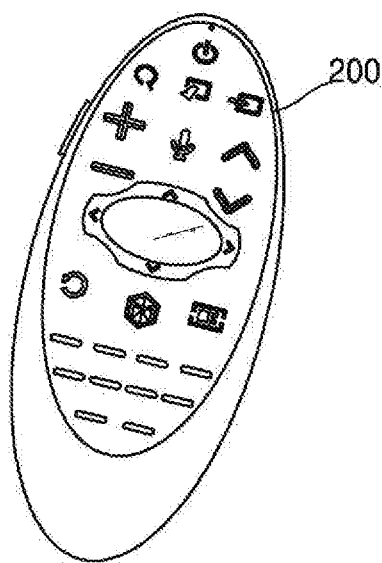
Figure 8B:
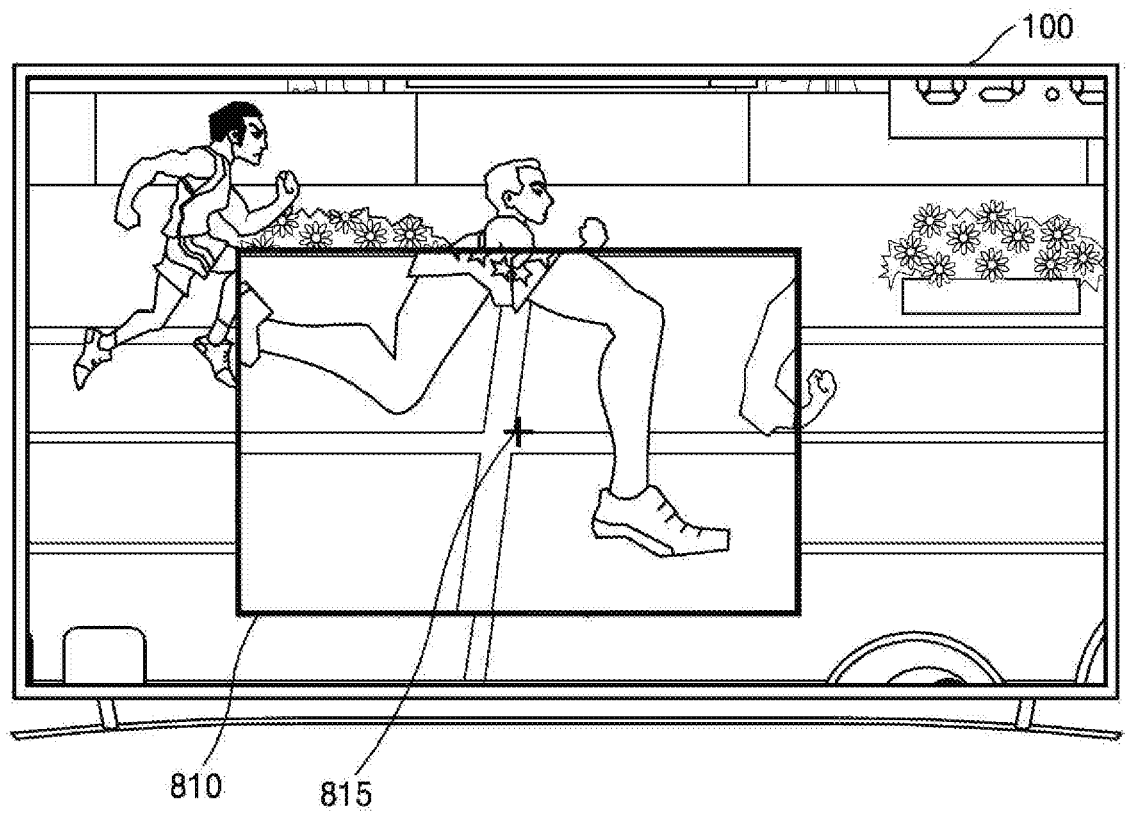
Figure 8B:
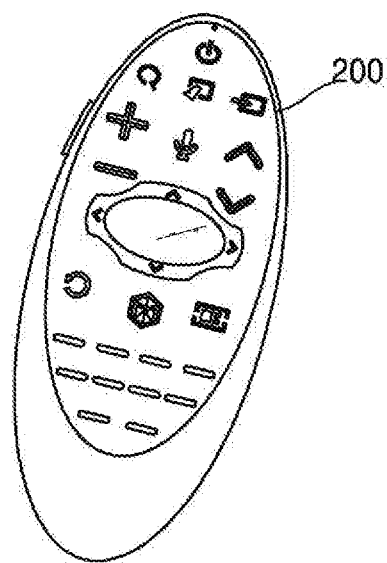

FIGS. 8A and 8B are diagrams showing an example in which a second image obtained by enlarging a part of a first image displayed in a first region of a display is displayed according to an embodiment of the present disclosure.

Referring to FIG. 8A, the display 120 may display a first image. The image display device 100 according to an embodiment may sense an input for enlargement. For example, the image display device 100 may display a zoom box 810 when sensing an input of pushing a particular key included in the control device 200.

The zoom box 810 may be a box for displaying a second image obtained by enlarging a part of the first image displayed in a first region. The zoom box 810 may be displayed to overlap the first region. Also, a cursor 815 indicating the center of the zoom box 810 may be displayed in the zoom box 810, and the center of the first region may be at the same position as the center of the zoom box 810.

Meanwhile, the cursor 815 may be moved in the display 120 in response to a user input. For example, when an input of any one arrow key among the four arrow keys included in the control device 200 is sensed, the image display device 100 may move the cursor 815 in a direction corresponding to the sensed input of the arrow key. In addition to inputs of the four arrow keys, the image display device 100 may sense a scroll key input, a touch input, inputs of moving the control device 200 upward, downward, leftward, and rightward, etc., and move the cursor 815 in the sensed direction.

As the cursor 815 is moved, the positions of the first region and the zoom box 810 may be moved in the same way. For example, when the cursor 815 is moved to the lower left as shown in FIG. 8B, the first region and the zoom box 810 may also be moved to the lower left. Also, when the first region and the zoom box 810 are moved, the image display device 100 may display a second image, which is generated by enlarging a part of a first image displayed in the moved first region, in the moved zoom box 810.

FIGS. 9A to 9E are diagrams showing an example in which a second image obtained by enlarging a part of a first image displayed in a first region is displayed according to an embodiment of the present disclosure.

Figure 9A:
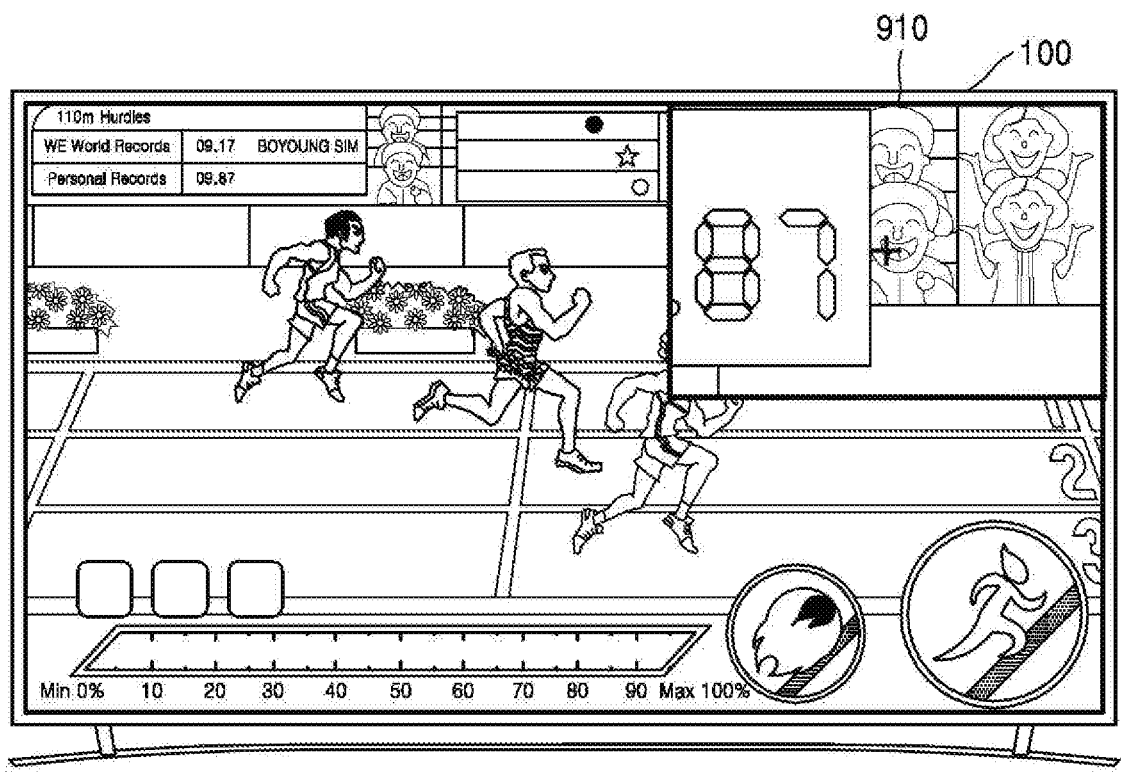
FIGS. 9A to 9E are diagrams showing an example in which a second image obtained by enlarging a part of a first image displayed in a first region is displayed according to an embodiment of the present disclosure.
Figure 9A:
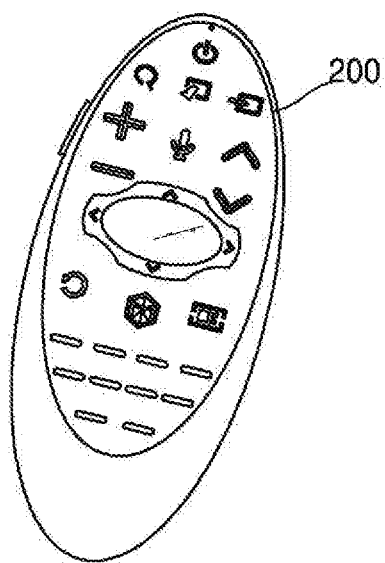

Referring to FIG. 9A, the display 120 according to an embodiment may display a first image. The image display device 100 according to an embodiment may sense an input for enlargement. For example, the image display device 100 may display a zoom box 910 when sensing an input of pushing a particular key included in the control device 200. The zoom box 910 may be a box in which a second image obtained by enlarging a part of the first image displayed in a first region is displayed. Since a zoom box has been described in detail with reference to FIG. 8A, the detailed description of the zoom box 910 will be omitted.

While the zoom box 910 is displayed, the image display device 100 may sense a zoom-in input or a zoom-out input. When a zoom-in input is sensed, the image display device 100 may generate the second image by increasing a magnification of the part of the first image displayed in the first region. Also, it is possible to increase the size of the zoom box 910 in which the second image is displayed.

Figure 9B:
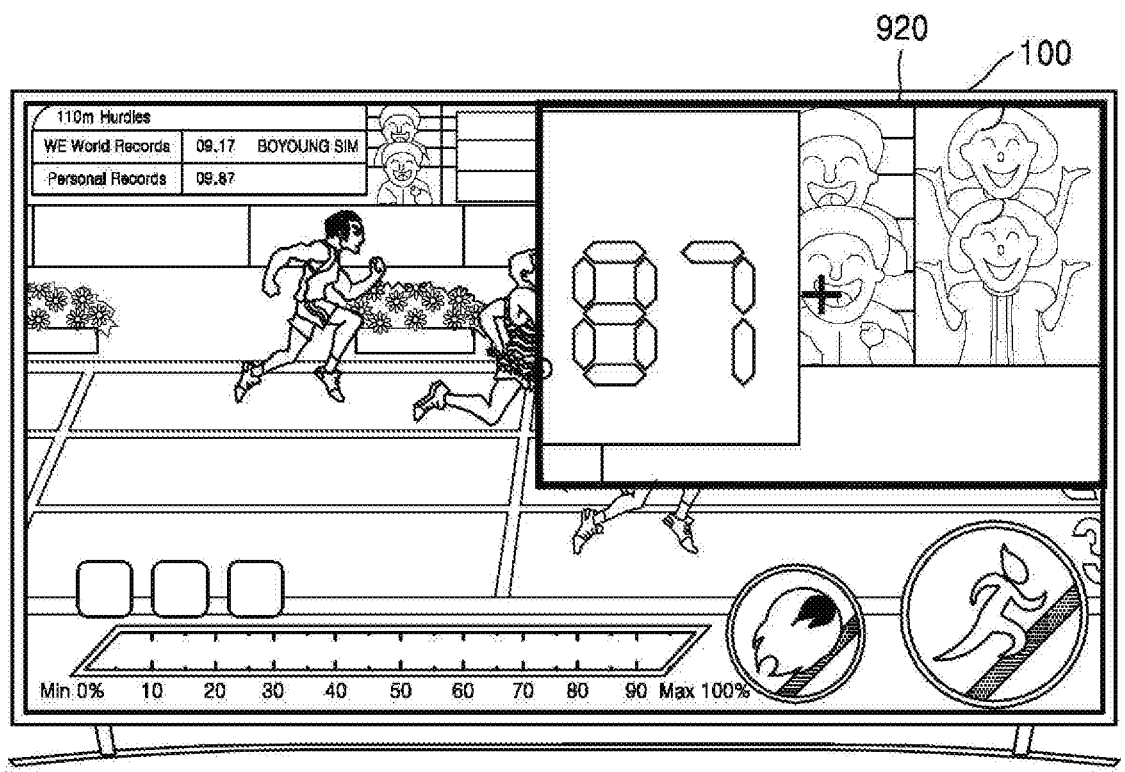
Figure 9B:
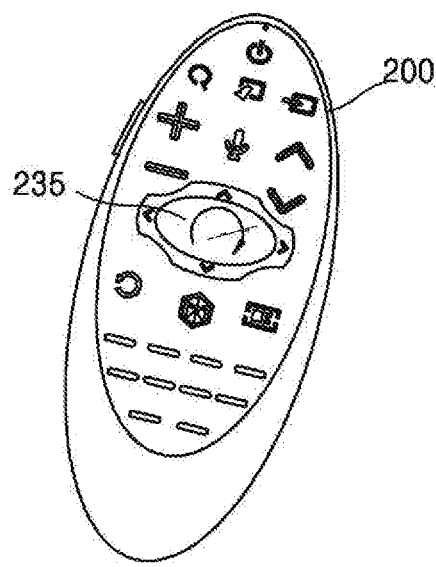

For example, referring to FIG. 9B, the image display device 100 may sense an input of drawing a particular pattern (e.g., a clockwise circle) on a touch pad 235 included in the control device 200 as a zoom-in input. Also, the image display device 100 may sense an input of rolling a scroll key included in the control device 200 in a particular direction (e.g., upward or rightward) as a zoom-in input.

When an input of drawing a clockwise circle on the touch pad 235 is sensed, the image display device 100 may increase the magnification of the part of the first image. For example, when the second image shown in FIG. 9A is an image obtained by enlarging the part of the first image twofold, the image display device 100 sensing the zoom-in input may enlarge the part of the first image threefold. Also, as shown in FIG. 9B, the image display device 100 may display the second image which has been enlarged three times in a zoom box 920.

Also, according to the number of times that a particular pattern is drawn, a magnification may be determined. For example, when an input of repeatedly drawing a clockwise circle two times, three times, and four times is sensed, the image display device 100 may increase the magnification fourfold, fivefold, and sixfold, respectively. However, a magnification determined according to the number of times drawn is not limited thereto.

Meanwhile, when a zoom-in input is sensed, the image display device 100 according to an embodiment may generate the second image by increasing a magnification of the part of the first image while keeping the size of a zoom box constant. At this time, since the size of the zoom box is kept constant, only a part of the second image may be displayed in the zoom box. Also, a magnification of the part of the second image may be increased according to the number of times of a zoom-in input.

On the other hand, when a zoom-out input is sensed, the image display device 100 may generate the second image by reducing a magnification of the part of the first image displayed in the first region. Also, it is possible to reduce the size of the zoom box 910 in which the second image is displayed.

Figure 9C:
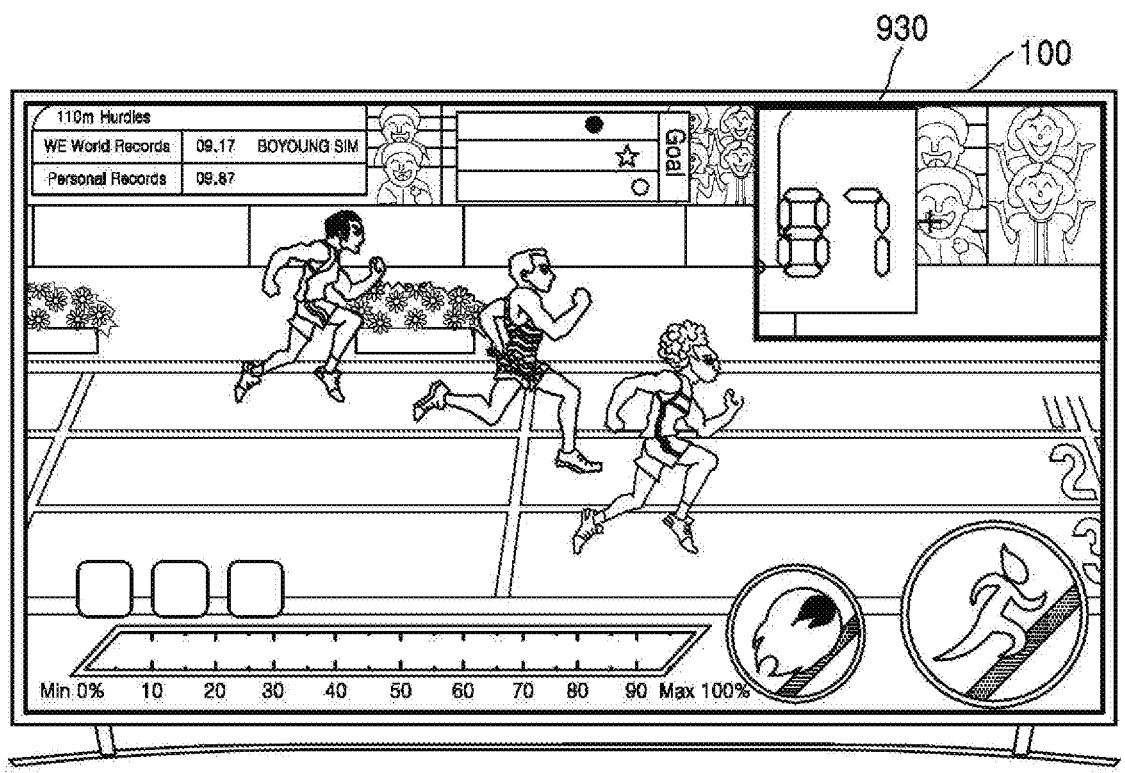
Figure 9C:
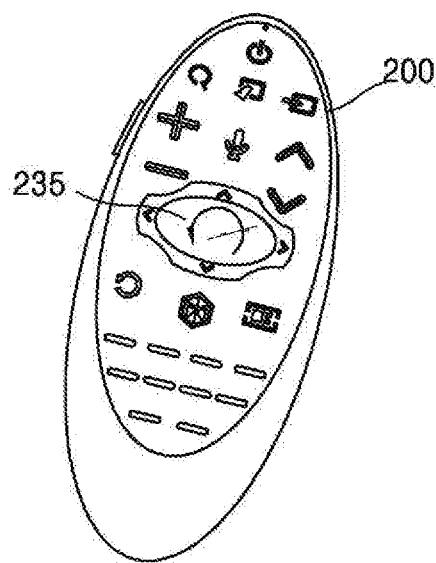

For example, referring to FIG. 9C, the image display device 100 may sense an input of drawing a particular pattern (e.g., a counterclockwise circle) on the touch pad 235 included in the control device 200 as a zoom-out input. Also, the image display device 100 may sense an input of rolling a scroll key included in the control device 200 in a particular direction (e.g., downward or leftward) as a zoom-out input.

When an input of drawing a counterclockwise circle on the touch pad 235 is sensed, the image display device 100 may reduce the magnification of the part of the first image. For example, when the second image shown in FIG. 9A is an image obtained by enlarging the part of the first image twofold, the image display device 100 sensing the zoom-out input may enlarge the part of the first image 1.8-fold. Also, as shown in FIG. 9C, the image display device 100 may display the second image which has been enlarged 1.8-fold in a zoom box 930.

According to the number of times that a particular pattern is drawn, a magnification may be determined. For example, when an input of repeatedly drawing a counterclockwise circle two times, three times, and four times is sensed, the image display device 100 may reduce the magnification 1.6-fold, 1.4-fold, and 1.2-fold, respectively. However, a magnification determined according to the number of times drawn is not limited thereto.

While a zoom box is displayed, the image display device 100 according to an embodiment may sense an input for increasing or reducing the size of the first region. When an input for increasing the size of the first region is sensed, the image display device 100 may increase the size of the first region. When the size of the first region is increased, a part of the first image displayed in the first region is increased in size, and accordingly, the second image obtained by enlarging the part of the first image is also increased in size. The image display device 100 may increase the size of the zoom box 910 in which the second image is displayed.

Figure 9D:
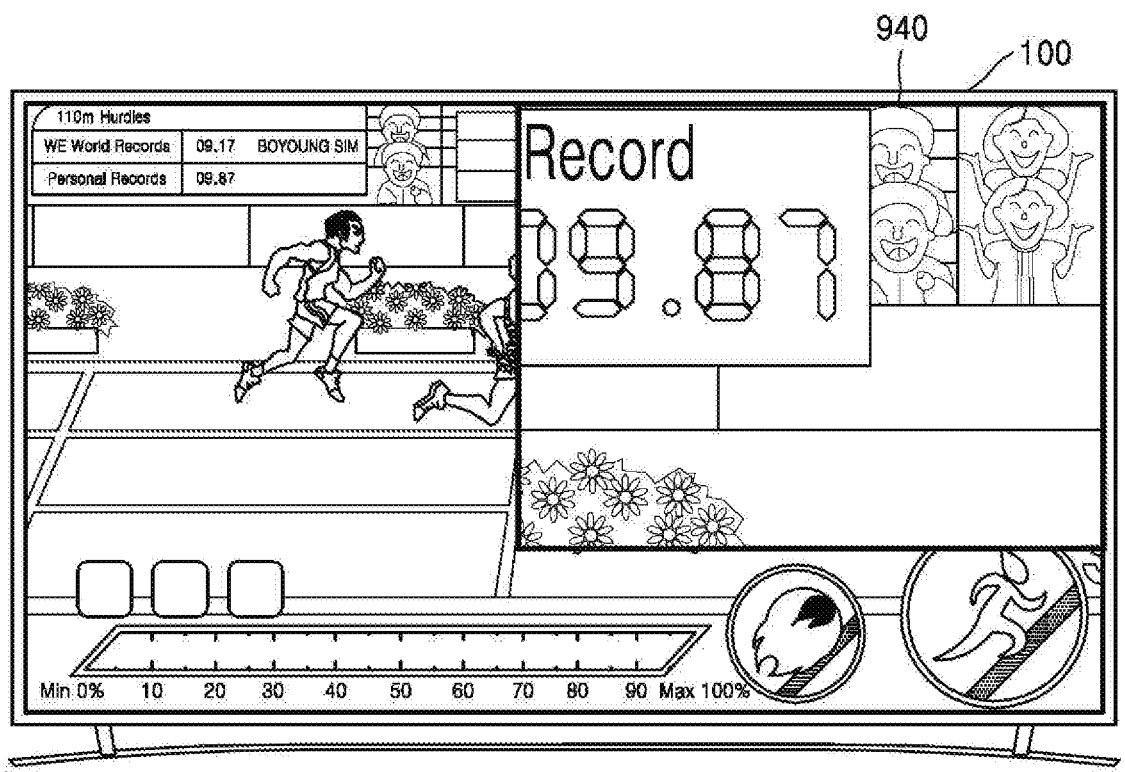
Figure 9D:
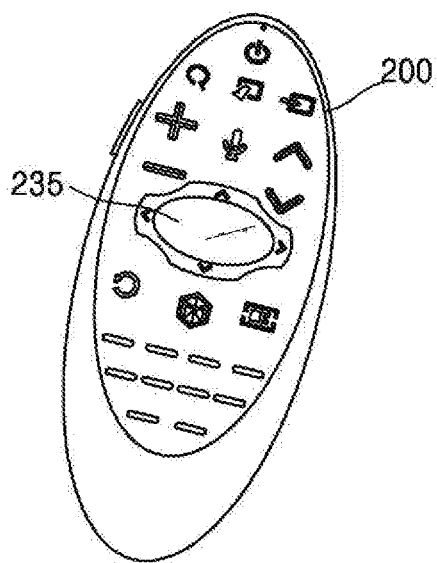

For example, referring to FIG. 9D, the image display device 100 may sense an input of pushing one (e.g., the up key or the right key) of the four arrow keys included in the control device 200 as an input for increasing the size of the first region. Also, as described with reference to FIG. 9B, the image display device 100 may sense an input of drawing a particular pattern on the touch pad 235, an input of rolling the scroll key in a particular direction, etc. as an input for increasing the size of the first region. However, an input for increasing the size of the first region is not limited thereto.

When an input of pushing the up key among the four arrow keys is sensed, the image display device 100 may increase the size of the first region 1.1-fold. When the size of the first region is increased, a part of the first image displayed in the first region may also be increased in size, and when the part of the first image displayed in the first region increased in size is enlarged, the size of a second image obtained by enlarging the part of the first image may also be increased. Here, a magnification of the part of the first image may be the same as before the size of the first region is increased. Also, the second image obtained by enlarging the part of the first image may be displayed in a zoom box, and as shown in FIG. 9D, the size of a zoom box 940 may be increased so as to be larger than the size of the zoom box 910 of FIG. 9A.

According to the number of times that the up key is pushed, the degree of increase (rate of increase) in the size of the first region may be determined. For example, when the up key is repeatedly pushed two times, three times, and four times, the image display device 100 may increase the size of the first region 1.2-fold, 1.3-fold, and 1.4-fold, respectively. However, the degree of increase in the size of the first region determined according to the number of times pushed is not limited thereto.

On the other hand, when an input for reducing the size of the first region is sensed, the image display device 100 may reduce the size of the first region. When the size of the first region is reduced, a part of the first image displayed in the first region is reduced in size, and accordingly, the second image obtained by enlarging the part of the first image is also reduced in size. The image display device 100 may reduce the size of a zoom box in which the second image is displayed.

Figure 9E:
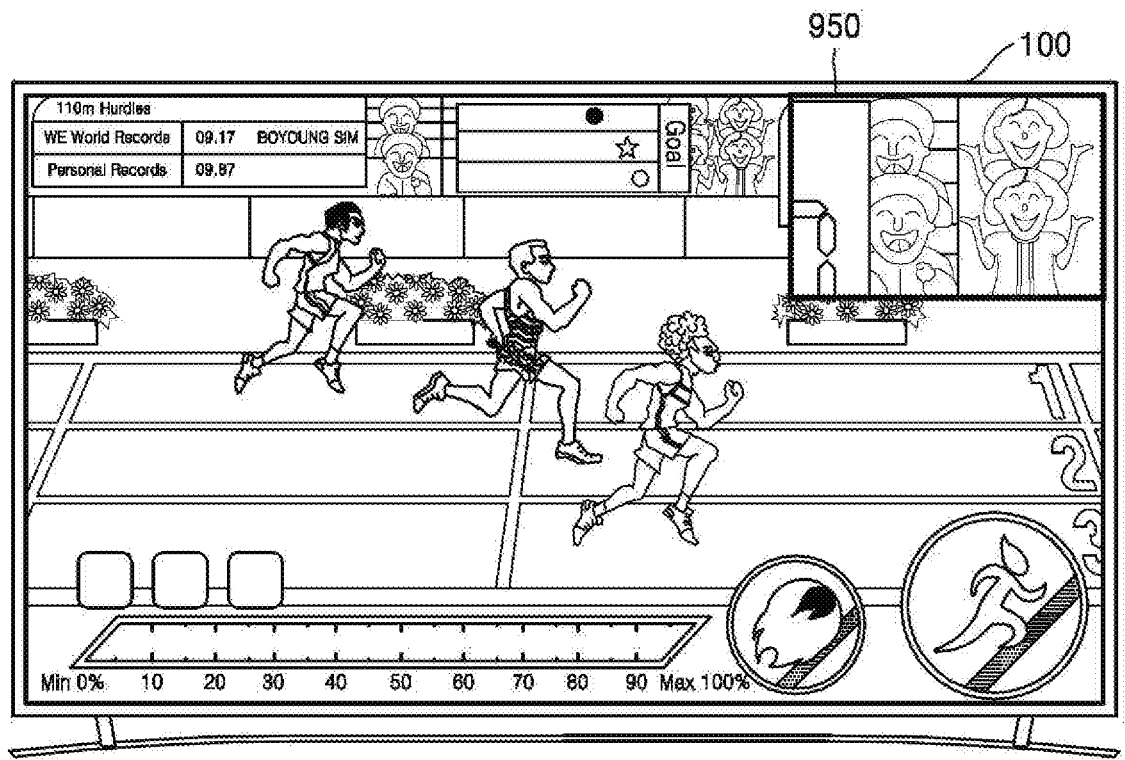
Figure 9E:
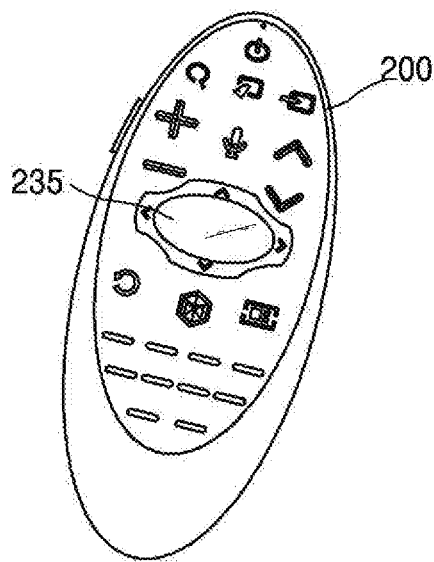

For example, referring to FIG. 9E, the image display device 100 may sense an input of pushing one (e.g., the down key or the left key) of the four arrow keys included in the control device 200 as an input for reducing the size of the first region. Also, as described with reference to FIG. 9C, the image display device 100 may sense an input of drawing a particular pattern on the touch pad 235, an input of rolling the scroll key in a particular direction, etc. as an input for reducing the size of the first region. However, an input for reducing the size of the first region is not limited thereto.

When an input of pushing the down key among the four arrow keys is sensed, the image display device 100 may reduce the size of the first region 0.9-fold. When the size of the first region is reduced, a part of the first image displayed in the first region may also be reduced in size, and when the part of the first image displayed in the first region reduced in size is increased, the size of a second image obtained by enlarging the part of the first image may also be reduced. Here, a magnification of the part of the first image may be the same as before the size of the first region is reduced. Also, the second image obtained by enlarging the part of the first image may be displayed in a zoom box, and as shown in FIG. 9E, the size of a zoom box 950 may be reduced so as to be smaller than the size of the zoom box 910 of FIG. 9A.

According to the number of times that the down key is pushed, the degree of reduction (rate of decrease) in the size of the first region may be determined. For example, when the down key is repeatedly pushed two times, three times, and four times, the image display device 100 may reduce the size of the first region 0.8-fold, 0.7-fold, and 0.6-fold, respectively. However, the degree of reduction in the size of the first region determined according to the number of times pushed is not limited thereto.

Figure 10:
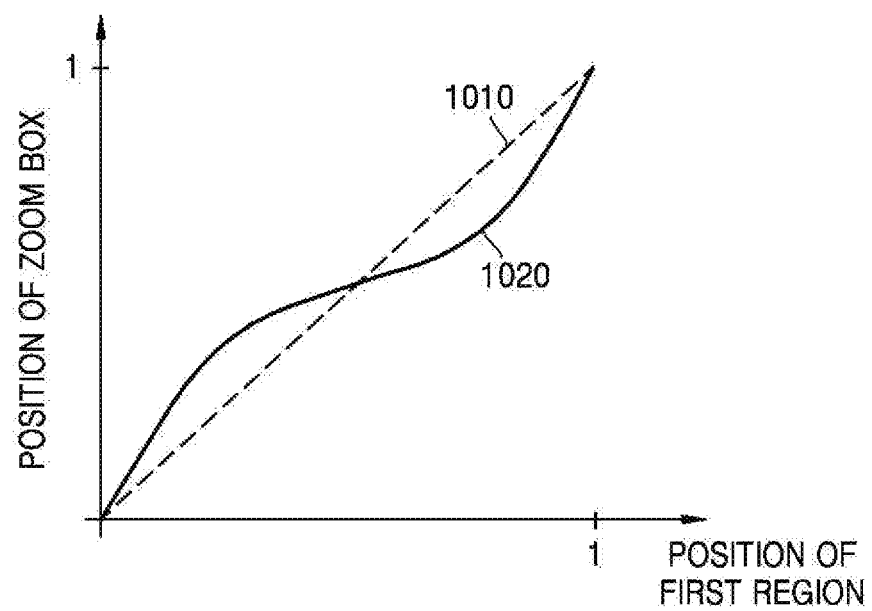
FIG. 10 is a graph showing the positional relationship between a first region and a zoom box according to an embodiment of the present disclosure.
Figure 11:
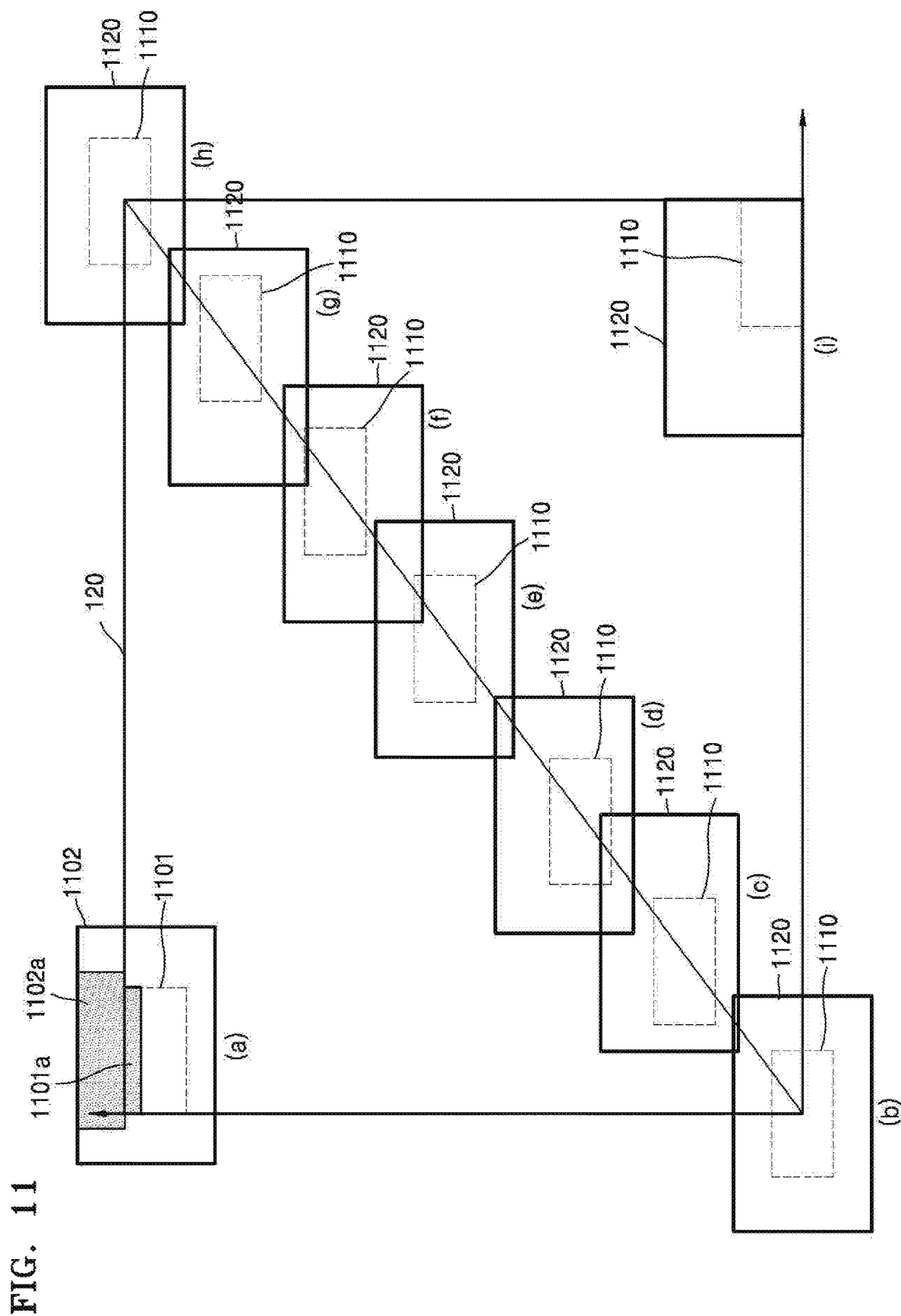
FIG. 11 is a diagram showing the positional relationship between a first region and a zoom box according to the graph of FIG. 10 according to an embodiment of the present disclosure.

FIG. 10 is a graph showing the positional relationship between a first region and a zoom box according to an embodiment of the present disclosure, and FIG. 11 is a diagram showing the positional relationship between a first region and a zoom box according to the graph of FIG. 10 according to an embodiment of the present disclosure.

A zoom box according to an embodiment may be a box for displaying a second image obtained by enlarging a part of a first image displayed in a first region of the display 120.

Referring to the graph of FIG. 10, the horizontal axis denotes the position of the first region, and the vertical axis denotes the position of the zoom box. The position of the first region according to an embodiment may be represented by the position of the center of the first region (e.g., x and y coordinates of the center of the first region), and the position of the zoom box may be represented by the position of the center of the zoom box (e.g., x and y coordinates of the center of the zoom box). For convenience of description, it is assumed below that coordinates of a display region ranges from 0 to 1 in the x-axis direction and ranges from 0 to 1 in the y-axis direction.

A dotted-line graph 1010 shown in FIG. 10 denotes that the position of the first region and the position of the zoom box are identical. When the position of the first region and the position of the zoom box are determined along the dotted-line graph 1010 of FIG. 10, a part of the second image obtained by enlarging an image of the first region may not be displayed in an edge region of the display 120. For example, when the whole of a first region 1101 is included in the display 120 but a part of a zoom box 1102 is not included in the display 120 as shown in (a) of FIG. 11, a part 1102a of the second image corresponding to a shaded part 1101a of the first region may not be displayed.

The image display device 100 according to an embodiment may determine the position of a zoom box dependent on the position of the first region based on a solid-line graph 1020 of FIG. 10.

The solid-line graph 1020 of FIG. 10 may be expressed as the following equation.

$$q = t + \frac{1}{10}\sin\pi t \qquad \text{Equation 1}$$

In Equation 1, t represents the position of the first region, and q represents the position of the zoom box. For example, t may be an x coordinate of the center of the first region, and q may be an x coordinate of the center of the zoom box. Alternatively, t may be a y coordinate of the center of the first region, and q may be a y coordinate of the center of the zoom box.

(b) to (i) of FIG. 11 are examples of determining the position of a first region 1110 and the position of a zoom box 1120 according to the solid-line graph 1020 of FIG. 10. Description will be made below based on x coordinates, but may also be applied to y coordinates in the same way.

For example, when the x and y coordinates of the center of the first region 1110 are any one of 0, 0.5, and 1 as shown in (b), (e), and (h) of FIG. 11, the position of the first region 1110 and the position of the zoom box 1120 may be identical. In other words, the position of the center of the first region 1110 and the position of the center of the zoom box 1120 may be identical.

If the x coordinate of the center of the first region 1110 increases from 0 to 0.5 as shown in (c) and (d) of FIG. 11, the x coordinate of the center of the zoom box 1120 may increase faster than the x coordinate of the center of the first region 1110, increase slower than the x coordinate of the center of the first region 1110 when the x coordinate of the center of the first region 1110 is equal to or larger than a certain value, and may be 0.5 when the x coordinate of the first region 1110 is 0.5.

Also, if the x coordinate of the center of the first region 1110 increases from 0.5 to 1 as shown in (f) and (g) of FIG. 11, the x coordinate of the center of the zoom box 1120 may increase slower than the x coordinate of the center of the first region 1110, increase faster than the x coordinate of the center of the first region 1110 when the x coordinate of the center of the first region 1110 is equal to or larger than a certain value, and may be 1 when the x coordinate of the first region 1110 is 1.

When the position of the first region 1110 and the position of the zoom box 1120 are determined in this way based on the solid-line graph 1020 of FIG. 10, the whole of a second image obtained by enlarging an image of the first region 1110 may be displayed even in an edge region of the display 120 as shown in (i) of FIG. 11.

Figure 12A:
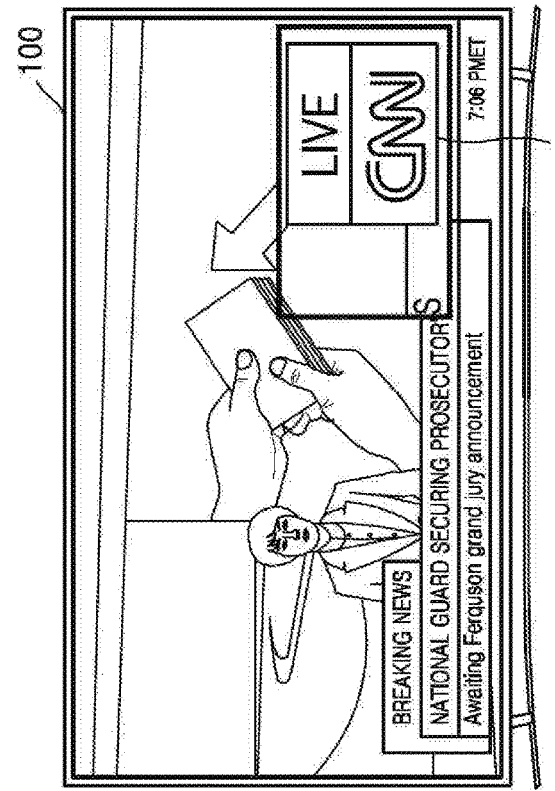
FIGS. 12A and 12B show diagrams of examples in which a zoom box is fixed in a pointing mode according to an embodiment of the present disclosure.
Figure 12A:
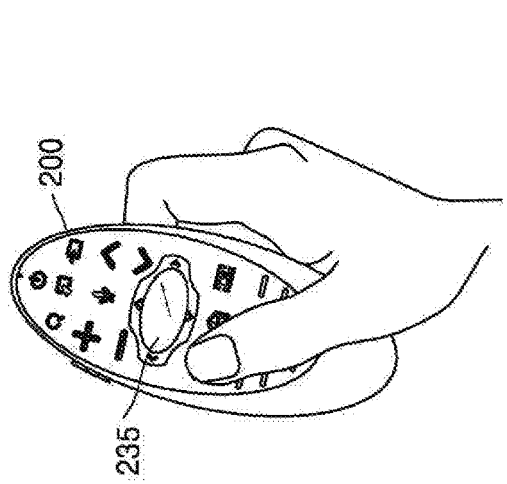
Figure 12B:
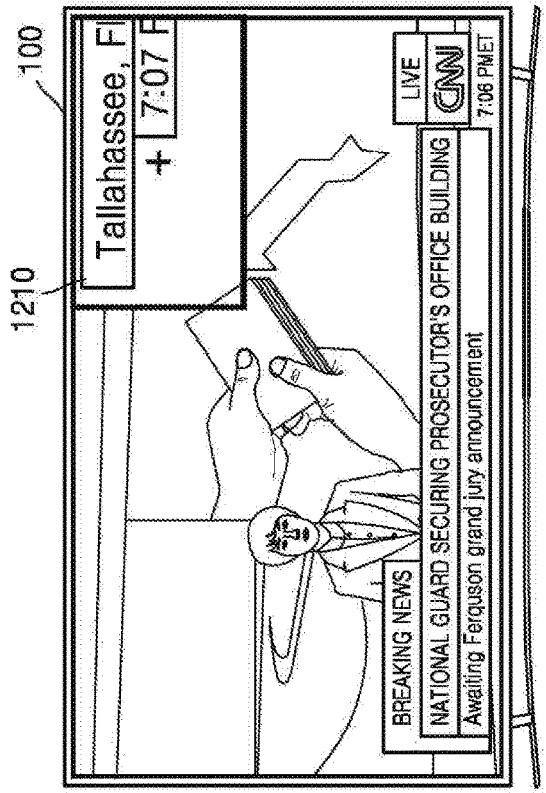
Figure 12B:
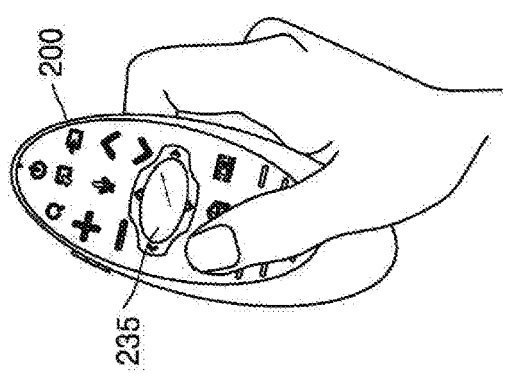

FIGS. 12A and 12B show diagrams of examples in which a zoom box is fixed in a pointing mode according to an embodiment of the present disclosure.

Referring to FIG. 12A, the display 120 according to an embodiment may display a first image. The image display device 100 according to an embodiment may sense an input for enlargement. For example, when an input of pushing a particular key included in the control device 200 is sensed, the image display device 100 may display a zoom box 1210. The zoom box 1210 is a box in which a second image obtained by enlarging a part of the first image displayed in a first region is displayed. Since a zoom box has been described in detail with reference to FIG. 8A, the detailed description of the zoom box 1210 will be omitted.

Referring to FIG. 12A, when an input of touching the touch pad 235 of the control device 200 is sensed or a certain button of the user input portion 230 of the control device 200 is pushed, the image display device 100 may operate in a pointing mode. When the image display device 100 operates in the pointing mode, the image display device 100 may receive a pointing signal from the control device 200 and move the zoom box 1210 displayed on the display 120.

For example, the image display device 100 may receive information on a motion of the control device 200 sensed through a sensor of the control device 200, calculate coordinates of the center of the zoom box 1210 on the display 120, and move the zoom box 1210 to correspond to the calculated coordinates.

Alternatively, the image display device 100 may move the zoom box 1210 on the display 120 according to a displacement value of a subject, such as the user's finger, moving on the touch pad 235 of the control device 200.

On the other hand, referring to FIG. 12B, when the touch pad 235 of the control device 200 is not touched or the certain button is not pushed, the zoom box 1210 may not be moved but may be fixed.

Figure 13A:
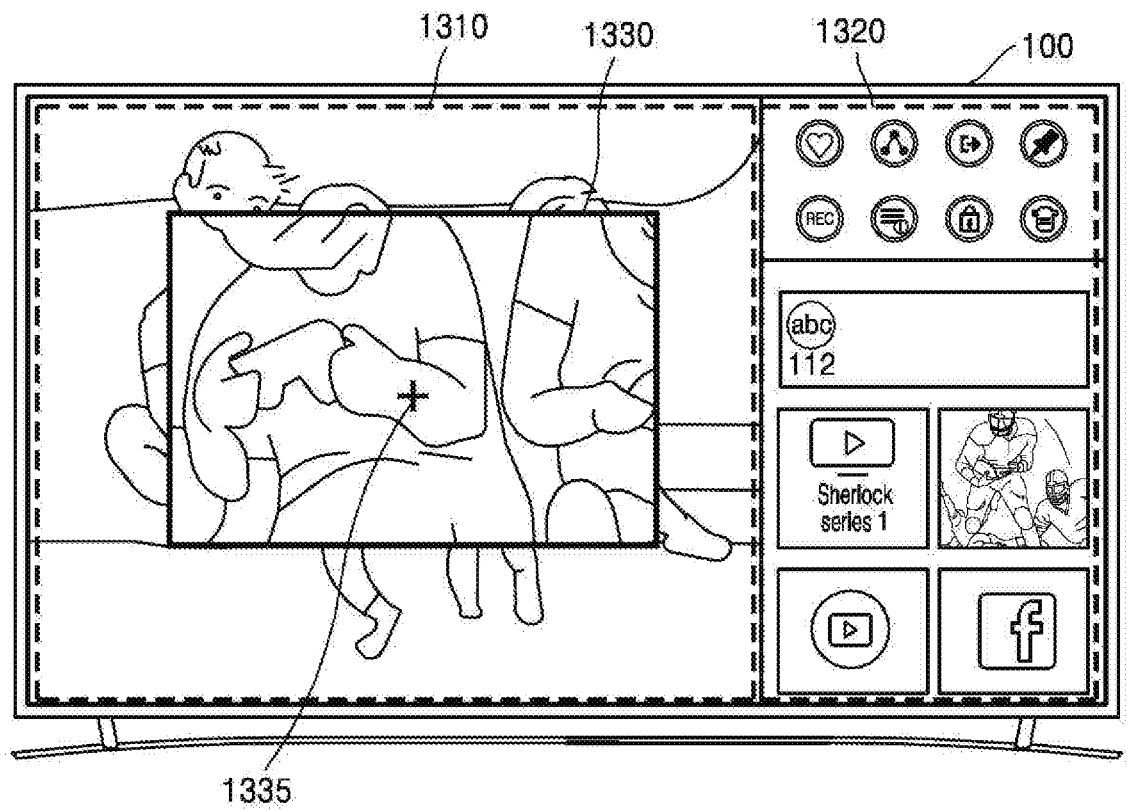
FIGS. 13A and 13B are diagrams illustrating a method in which an image display device enlarges content displayed on a display depending on an attribute of the content according to an embodiment of the present disclosure.
Figure 13A:
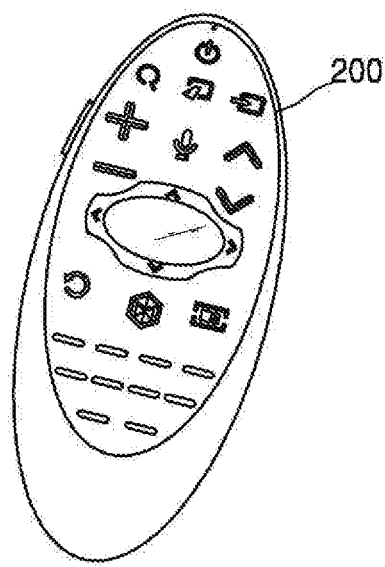
Figure 13B:
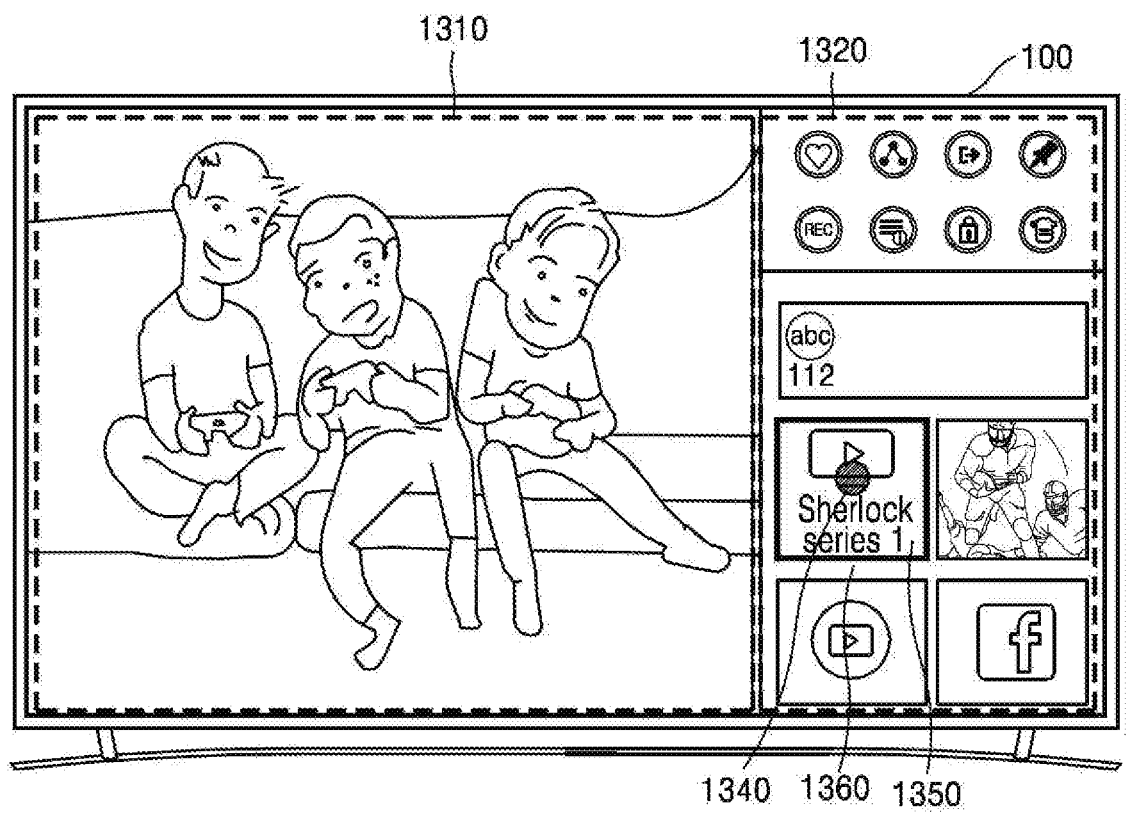
Figure 13B:
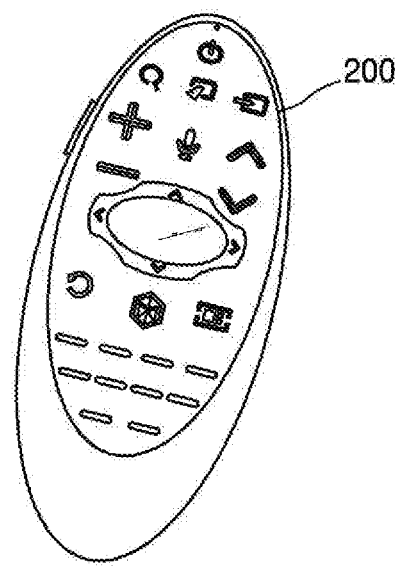

FIGS. 13A and 13B are diagrams illustrating a method in which an image display device enlarges content displayed on a display depending on an attribute of the content according to an embodiment of the present disclosure.

Referring to FIG. 13A, the display 120 according to an embodiment may include a video region 1310 in which video content is played, and a UI region 1320 in which a UI screen is displayed. For example, as shown in FIG. 13A, the image display device 100 may display a currently played video frame in the video region 1310. Also, the image display device 100 may display a user menu screen including a plurality of items in the UI region 1320. For example, the plurality of items may include an item representing a channel related to a currently played video, an item representing a TV show related to the currently played video, and items representing applications related to the currently played video. Also, menu icons for using various functions of the image display device 100 may be included. However, the plurality of items are not limited thereto.

The plurality of items may be displayed with images and text. For example, when an item represents a broadcast channel, the item may be displayed with a logo image of the channel or an image representing a program currently aired on the channel. Also, the item representing a broadcast channel may be displayed with text representing the number of the channel or the name of the program currently aired on the channel. When an item represents an application, the item may be displayed with an image representing the application or a last executed application screen. Also, the item representing an application may be displayed with text representing the name of the application.

A region in which each of the plurality of items is displayed may be a rectangle, and the sizes of rectangles may be identical to each other or different from each other. For example, the heights and widths of the rectangles may differ from each other, and regions in which the items are displayed may have different widths or heights according to types, characteristics, etc. of pieces of content separately corresponding to the plurality of items.

Referring back to FIG. 13A, when a first region to be enlarged is positioned in the video region 1310, the image display device 100 may display a second image obtained by enlarging a part of a video frame displayed in the first region in a zoom box 1330 as described with reference to FIGS. 8A and 8B. The zoom box 1330 may be displayed to overlap the first region. Since a method of enlarging an image of the first region and displaying the enlarged image in a zoom box has been described in detail with reference to FIGS. 8A-8B, 9A-9E, 10, and 11, the detailed description thereof will be omitted.

Meanwhile, a cursor indicating the position of a user input may be displayed in the UI region 1320. For example, if the zoom box 1330 displayed in the video region 1310 is moved toward the UI region 1320 using the control device 200, etc., when a center cursor 1335 of the zoom box 1330 is moved to the UI region 1320 over the boundary between the video region 1310 and the UI region 1320, the zoom box 1330 is not displayed, but a cursor 1340 indicating the position of a user input is displayed as shown in FIG. 13B.

The cursor 1340 may be moved according to a sensed user input in the UI region 1320. Although FIG. 13B shows the cursor 1340 in a circular shape, the cursor 1340 is not limited thereto and may have various shapes and sizes. Also, the shape and size of the cursor 1340 may be variously set based on a user input. The cursor 1340 may be positioned in any one of the plurality of items displayed in the UI region 1320. When the cursor 1340 is positioned in the region of any one of the plurality of items, a corresponding item 1350 may be highlighted. For example, the color of the highlighted item 1350 may be changed. Also, an image or text displayed in the item 1350 may be increased in size. For example, as shown in FIG. 13B, the text "Sherlock series 1" displayed in the item 1350 in which the cursor 1340 is positioned may be increased in size. Even when the image or text displayed in the item 1350 is increased in size, the size of an item region 1360 may be kept constant.

When a user input for selecting a highlighted item is sensed, the controller 110 may perform an operation corresponding to the item. For example, if the highlighted item represents a related TV show, when an input for selecting the highlighted item is sensed, the controller 110 may display the playback screen of the TV show in the video region 1310.

FIGS. 14A to 14H are diagrams showing the positional relationship between a selected region and a zoom box according to an embodiment of the present disclosure when a display includes regions having different attributes.

Figure 14A:
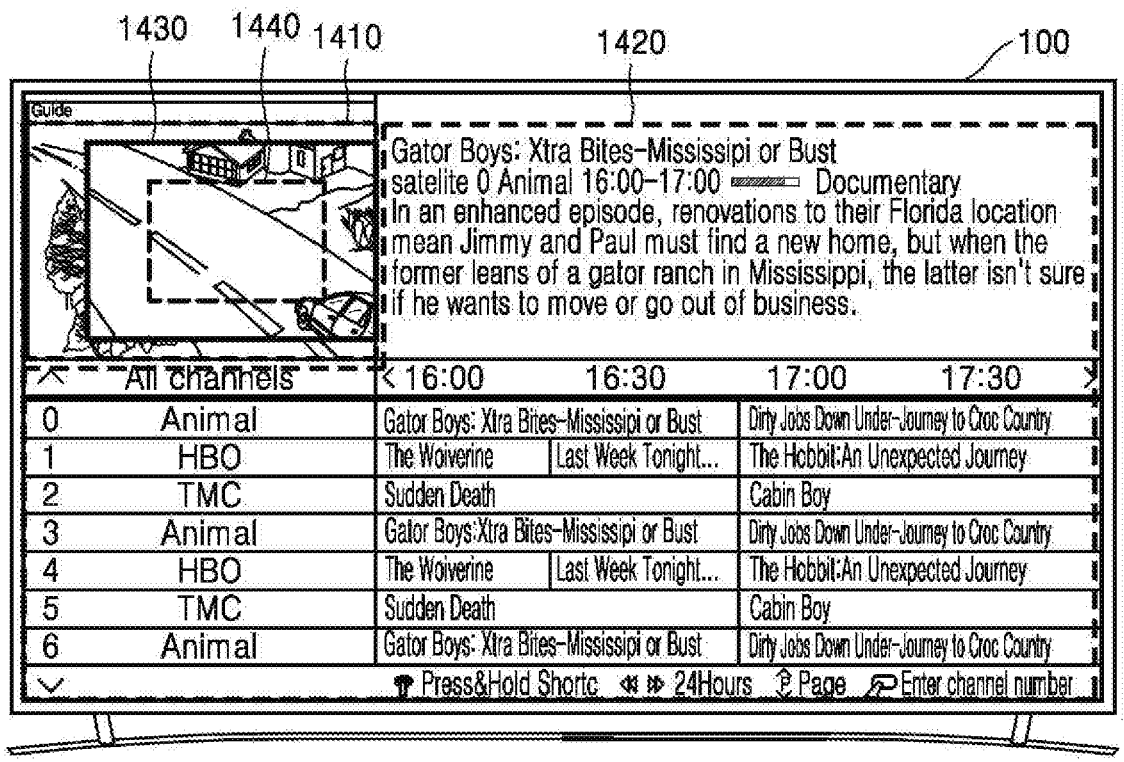
FIGS. 14A to 14H are diagrams showing the positional relationship between a selected region and a zoom box according to an embodiment of the present disclosure when a display includes regions having different attributes.
Figure 14A:
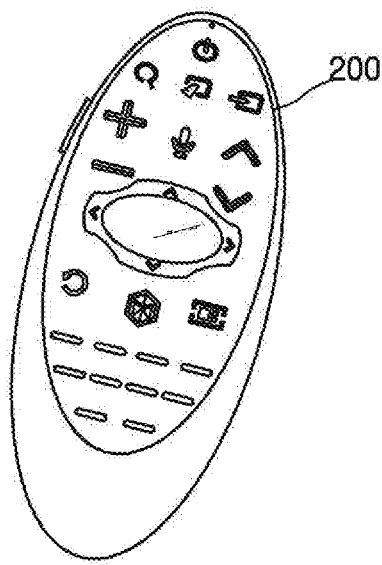

Referring to FIG. 14A, the image display device 100 according to an embodiment may include a first display region 1410 in which content having a first attribute is displayed, and a second display region 1420 in which content having a second attribute is displayed. For example, content having the first attribute may be video content, and video data processed by the video processor 180 may be displayed as an image in the first display region 1410. Also, content having the second attribute may be a user input interface screen, and a GUI screen including icons, images, text, etc. processed by the graphics processor 184 may be displayed in the second display region 1420. However, content displayed in the first and second display regions 1410 and 1420 is not limited thereto.

In addition, the image display device 100 may display a zoom box 1430. The zoom box 1430 is a box for displaying a second image obtained by enlarging a first image, which is an image displayed in a selection region 1440 selected by the user. Referring to FIG. 14A, the selection region 1440 may be a region displayed with a dotted line, and the zoom box 1430 may be a box displayed with a solid line. The zoom box 1430 may be displayed to overlap the selection region 1440.

The selection region 1440 according to an embodiment may be moved in the display 120 by an arrow key input, a touch input, etc. to the control device 200.

In FIGS. 14A to 14H, a case in which the selection region 1440 is moved from the first display region 1410 to the second display region 1420 will be described as an example.

Referring to FIG. 14A, the selection region 1440 is included in the first display region 1410, and the position of the selection region 1440 (the position of the center of the selection region 1440) and the position of the zoom box 1430 (the position of the center of the zoom box 1430) may be identical.

Figure 14B:
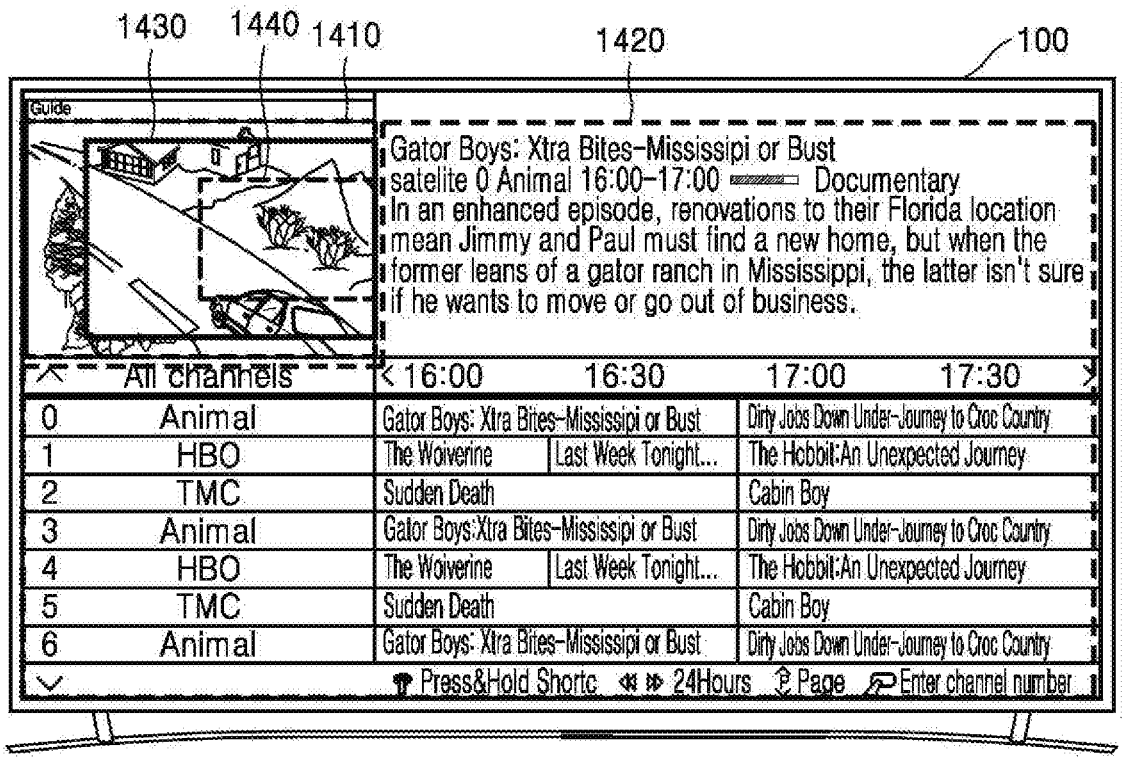
Figure 14B:
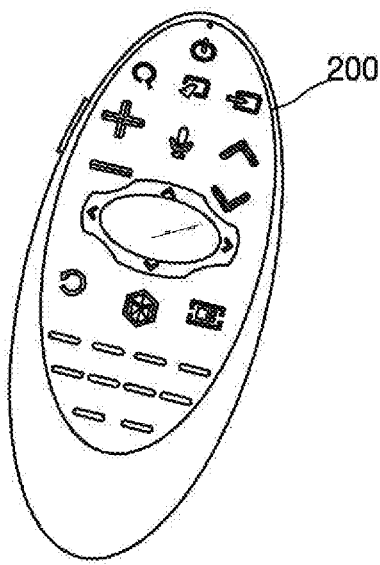
Figure 14C:
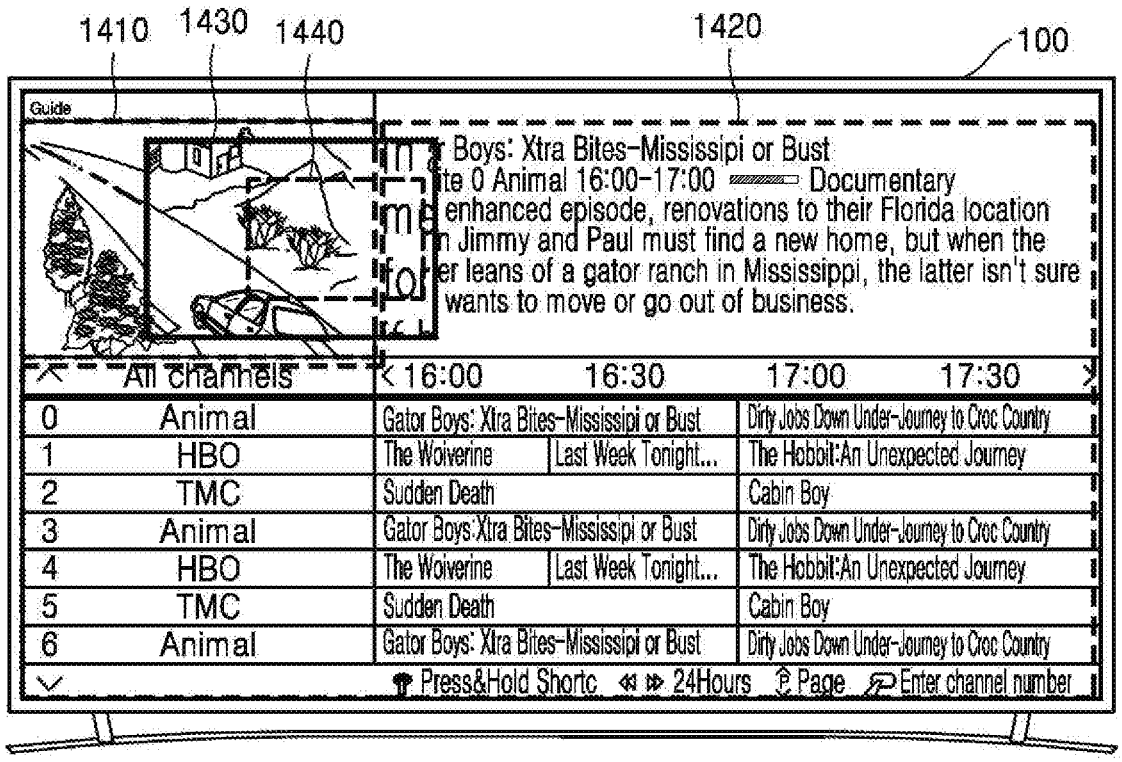
Figure 14C:
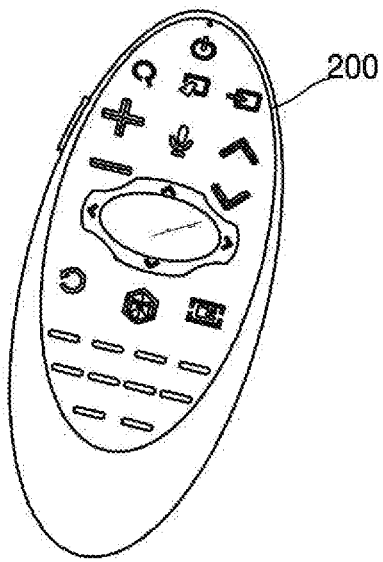

When the selection region 1440 is moved toward the second display region 1420 (e.g., to the right), the zoom box 1430 may also be moved in the same way as the selection region 1440. At this time, from a point in time when the right boundary of the zoom box 1430 comes in contact with the boundary between the first display region 1410 and the second display region 1420 while the zoom box 1430 is moved, the zoom box 1430 is not moved as shown in FIG. 14A even if the selection region 1440 is moved toward the second display region 1420. Also, from a point in time when the right boundary of the selection region 1440 comes in contact with the boundary between the first display region 1410 and the second display region 1420 as shown in FIG. 14B while the zoom box 1430 is not moved but only the selection region 1440 is moved to the right, the selection region 1440 and the zoom box 1430 are moved together as shown in FIG. 14C. At this time, the zoom box 1430 may be moved faster than the selection region 1440.

Also, a first sub-image displayed in the first display region 1410 among images displayed in the selection region 1440 may be enlarged and displayed in the first display region 1410 of the zoom box 1430, and a second sub-image displayed in the second display region 1420 among images displayed in the selection region 1440 may be enlarged and displayed in the second display region 1420 of the zoom box 1430.

Figure 14D:
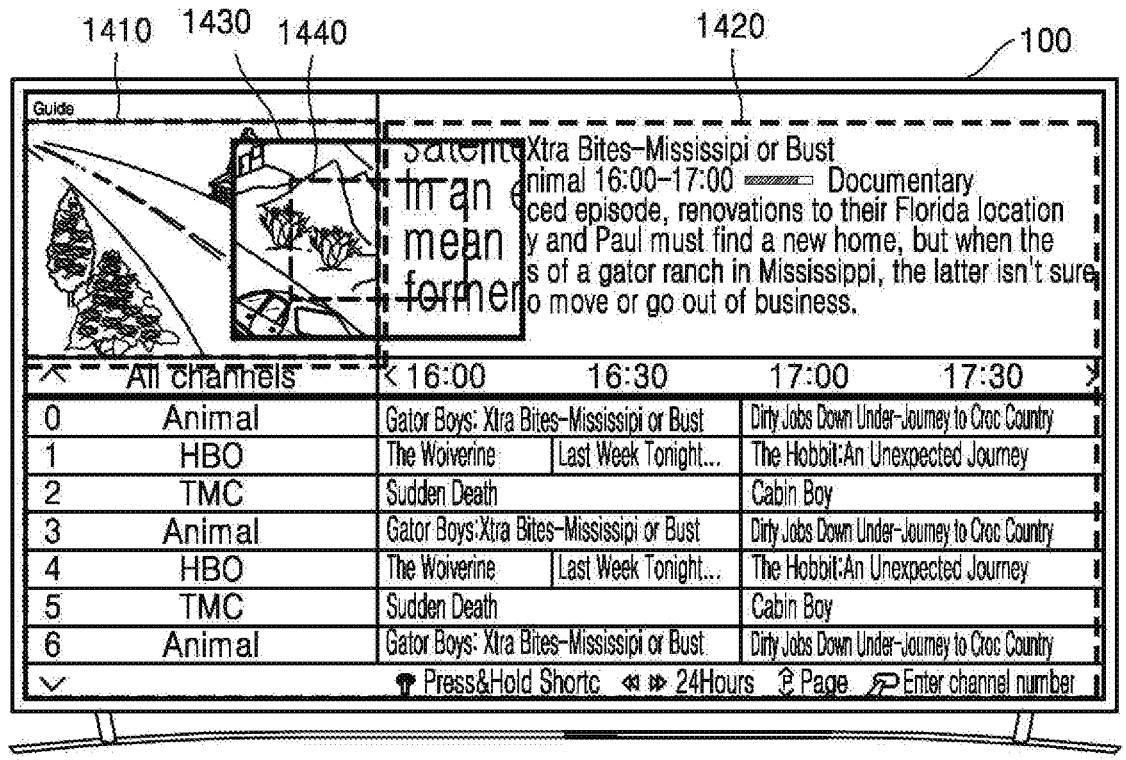
Figure 14D:
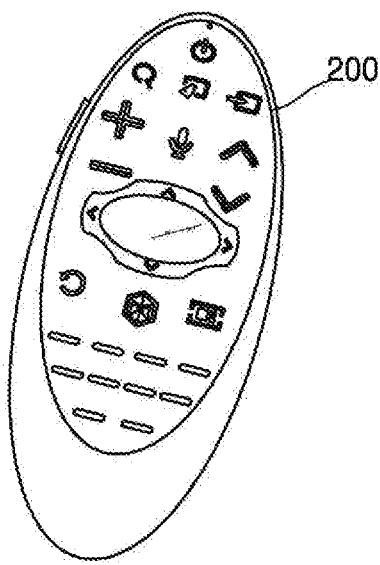

Meanwhile, when the center of the selection region 1440 is positioned at the boundary between the first display region 1410 and the second display region 1420 as shown in FIG. 14D while the selection region 1440 and the zoom box 1430 are moved together, the center of the zoom box 1430 may also be positioned at the boundary between the first display region 1410 and the second display region 1420.

Figure 14E:
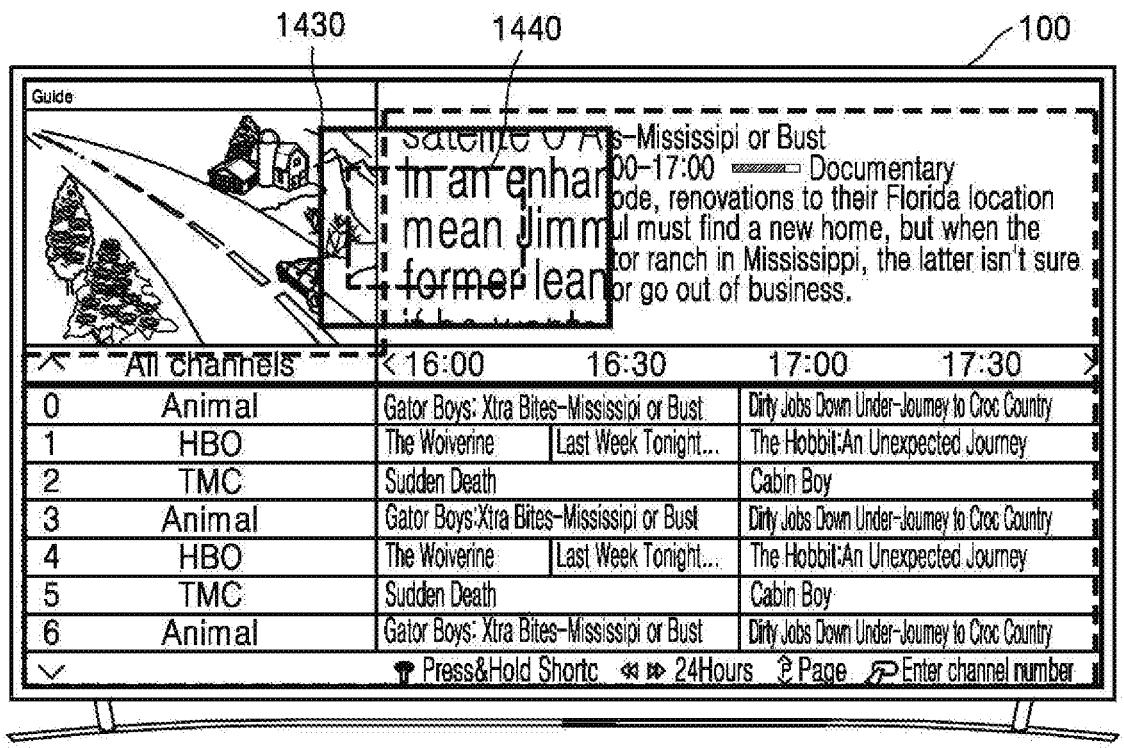
Figure 14E:
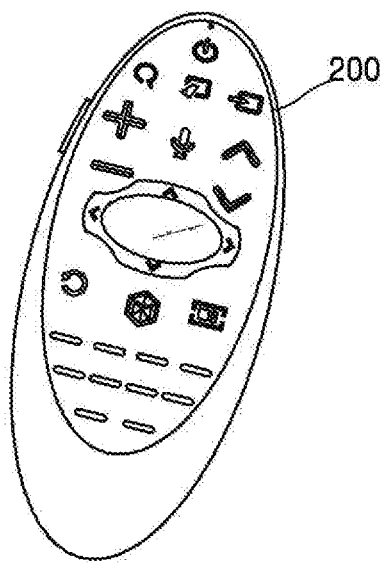

From the point in time when the positions of the selection region 1440 and the zoom box 1430 are identical, the zoom box 1430 may be moved faster than the selection region 1440. Accordingly, as shown in FIG. 14E, the position of the zoom box 1430 (the position of the center of the zoom box 1430) may be more right than the position of the selection region 1440 (the position of the center of the selection region 1440).

Figure 14F:
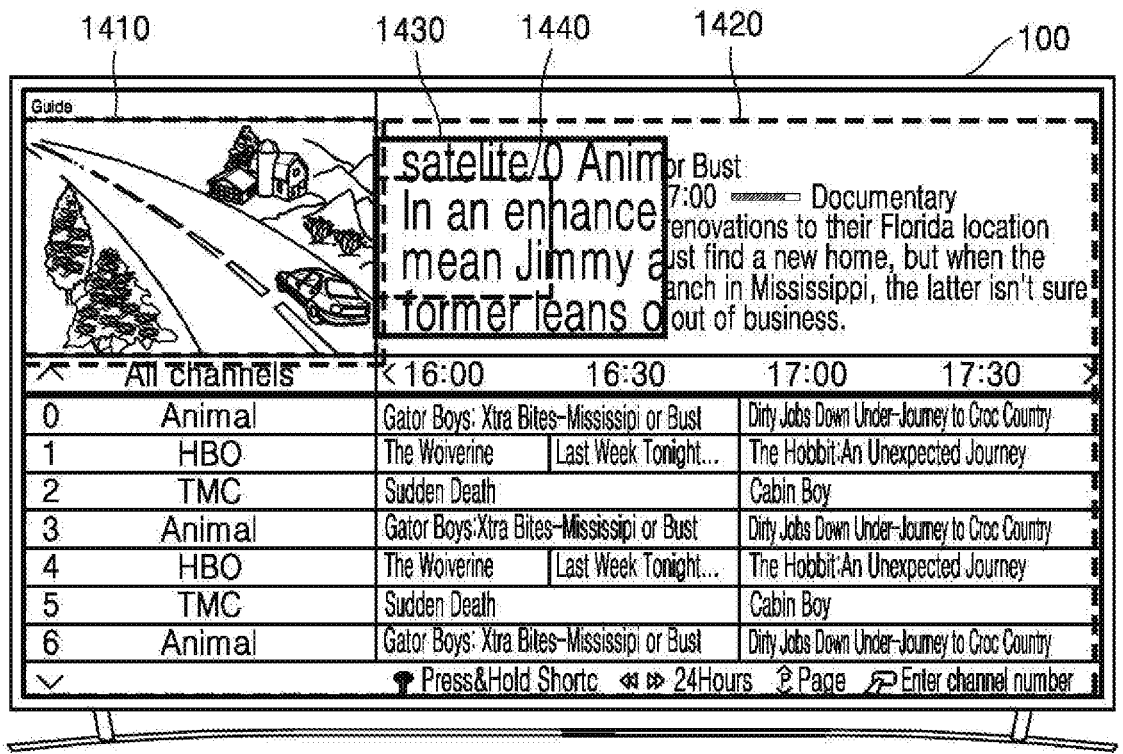
Figure 14F:
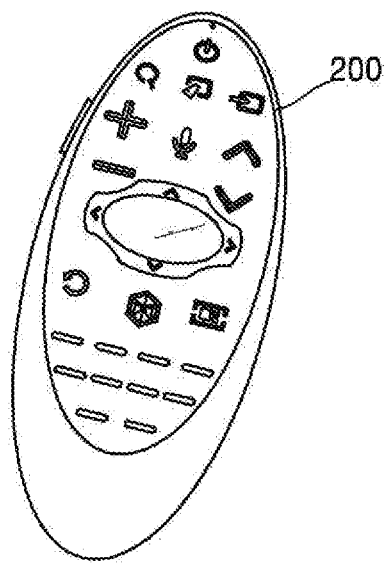

From a point in time when the left boundaries of the selection region 1440 and the zoom box 1430 come in contact with the boundary between the first display region 1410 and the second display region 1420 as shown in FIG. 14F while the selection region 1440 and the zoom box 1430 are moved to the right, the zoom box 1430 is not moved even if the selection region 1440 is moved toward the second display region 1420.

Figure 14G:
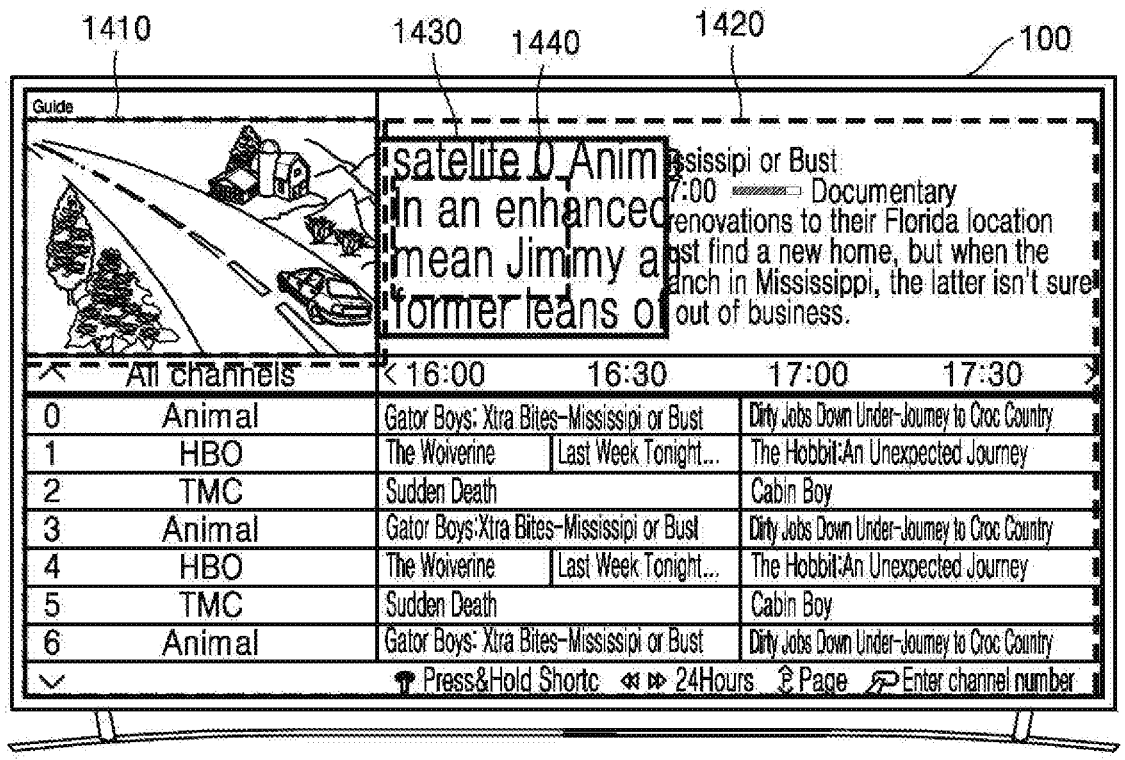
Figure 14G:
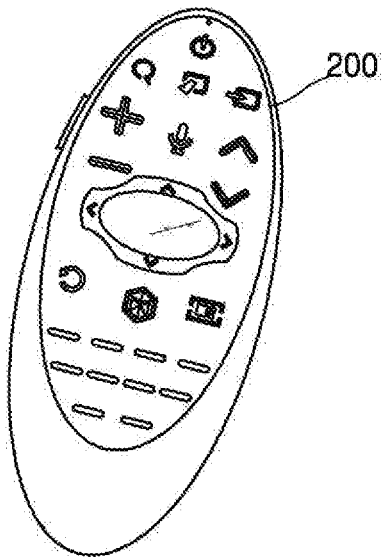
Figure 14H:
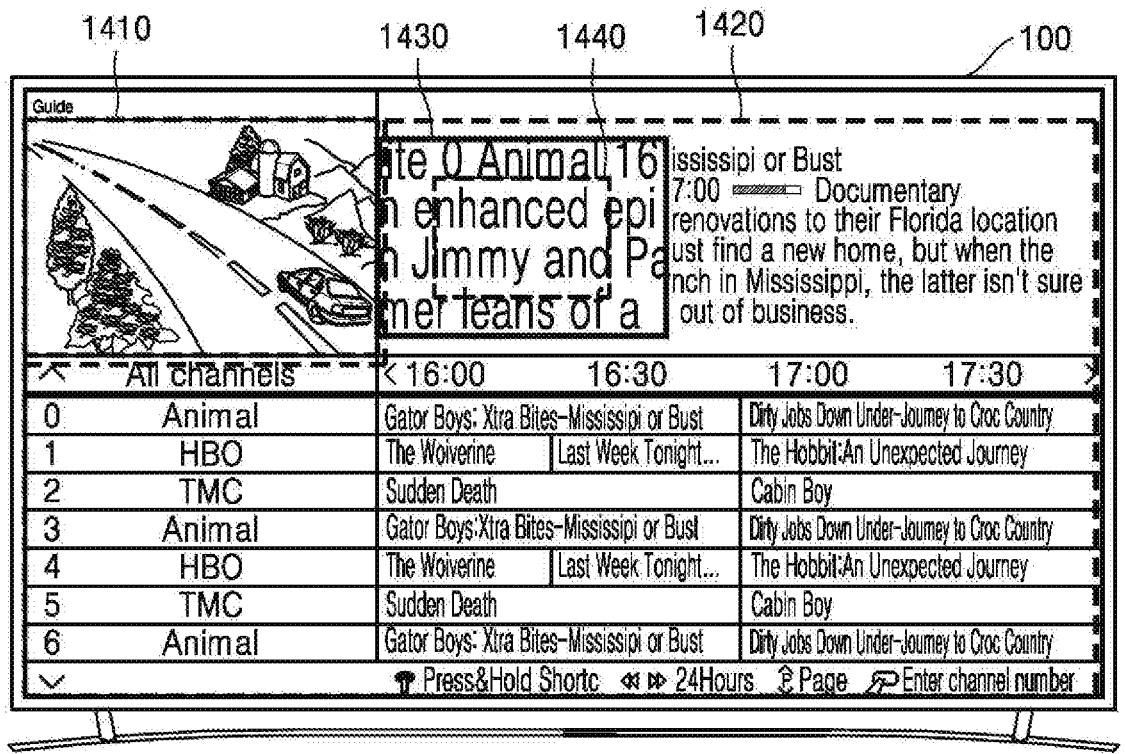

Referring to FIGS. 14G and 14H, until the position of the zoom box 1430 and the position of the selection region 1440 become identical, the zoom box 1430 is not moved but only the selection region 1440 is moved to the right. From the point in time when the position of the selection region 1440 and the position of the zoom box 1430 become identical, the selection region 1440 and the zoom box 1430 may be moved together.

Meanwhile, only an example in which the selection region 1440 is moved to the right has been shown in FIGS. 14A to 14H and described, but it may also be applied in the same way to a case in which the selection region 1440 is passed through the boundary between the first display region 1410 and the second display region 1420 and moved down.

FIGS. 15A to 15E are diagrams showing an example in which an image display device enlarges a particular object and displays the enlarged object according to an embodiment of the present disclosure.

Figure 15A:
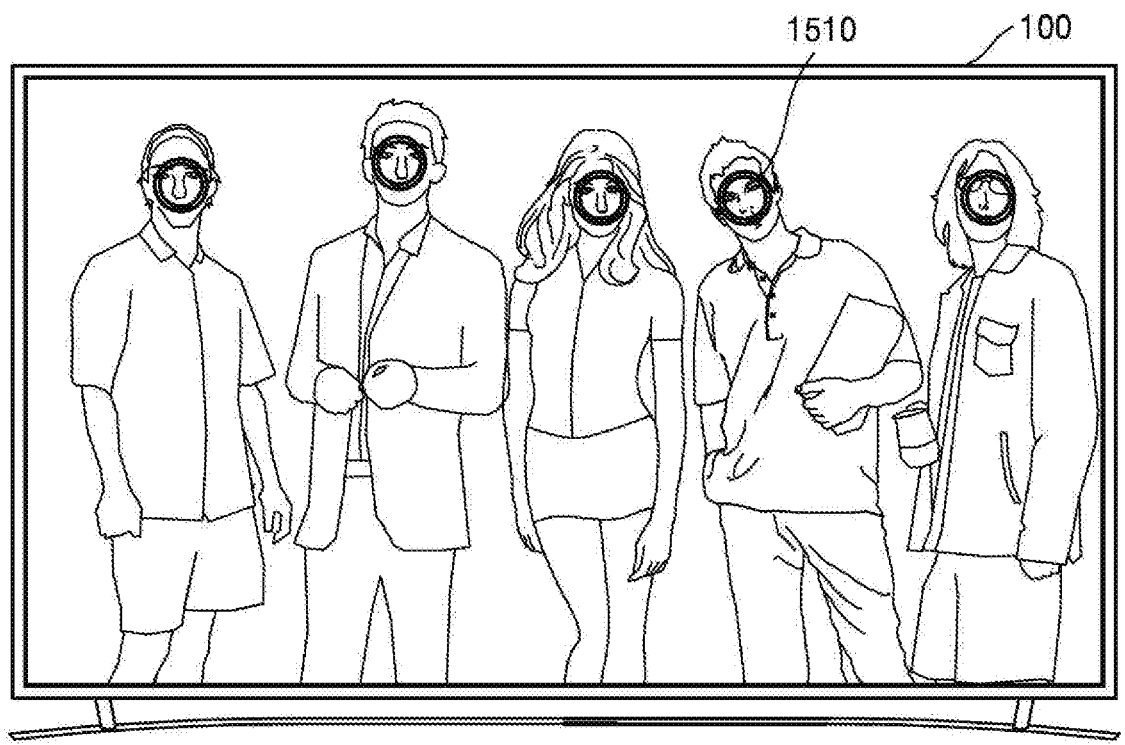
FIGS. 15A to 15E are diagrams showing an example in which an image display device enlarges a particular object and displays the enlarged object according to an embodiment of the present disclosure.
Figure 15A:
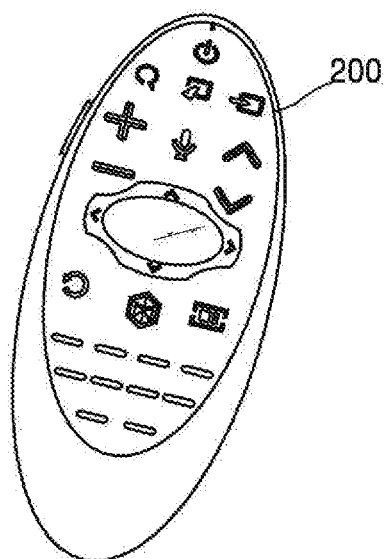

Referring to FIG. 15A, the display 120 according to an embodiment may display a first image including at least one object. The image display device 100 may detect the at least one object included in the first image and display the detected object. For example, the controller 110 may analyze the first image based on pixel values constituting the first image, brightness changes, extraction of feature points, and so on. Also, the controller 110 may detect objects, such as a human face, an animal face, a building, etc., in the first image through object recognition. A method and algorithm for detecting an object in an image is already known in relevant fields, and thus the detailed description thereof will be omitted.

The controller 110 may generate a second image by enlarging a selected object among objects detected in the first image, and display the second image on the display 120. For example, the display 120 may display marks 1510 on the objects detected in the first image. When an input for selecting a mark displayed on the display 120 is sensed, the controller 110 may enlarge an object corresponding to the selected mark and display the enlarged object.

Figure 15B:
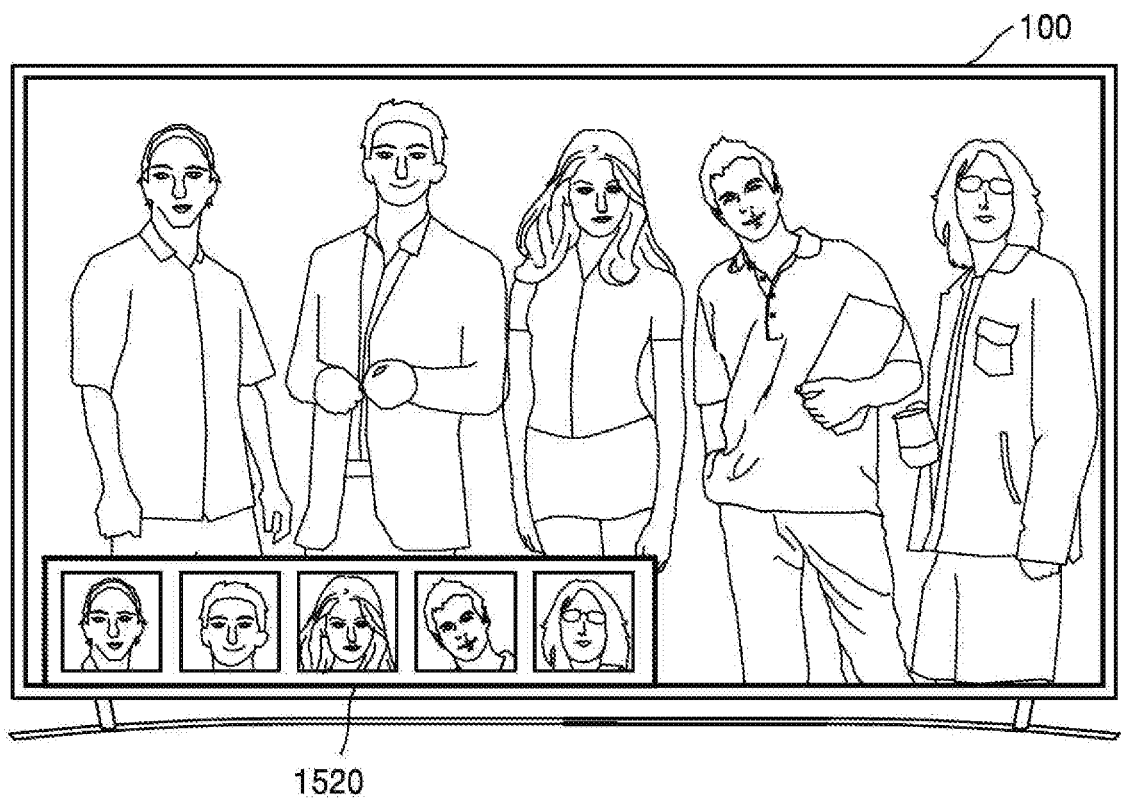
Figure 15B:
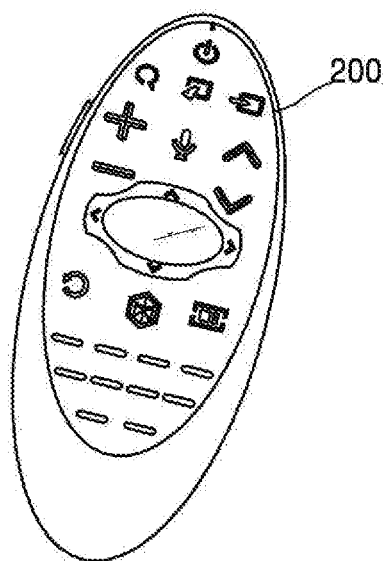

Referring to FIG. 15B, the display 120 may display a candidate list 1520 showing the detected objects. When an input for selecting any one of the objects included in the candidate list 1520 is sensed, the controller 110 may enlarge the selected object and display the enlarged object.

Figure 15C:
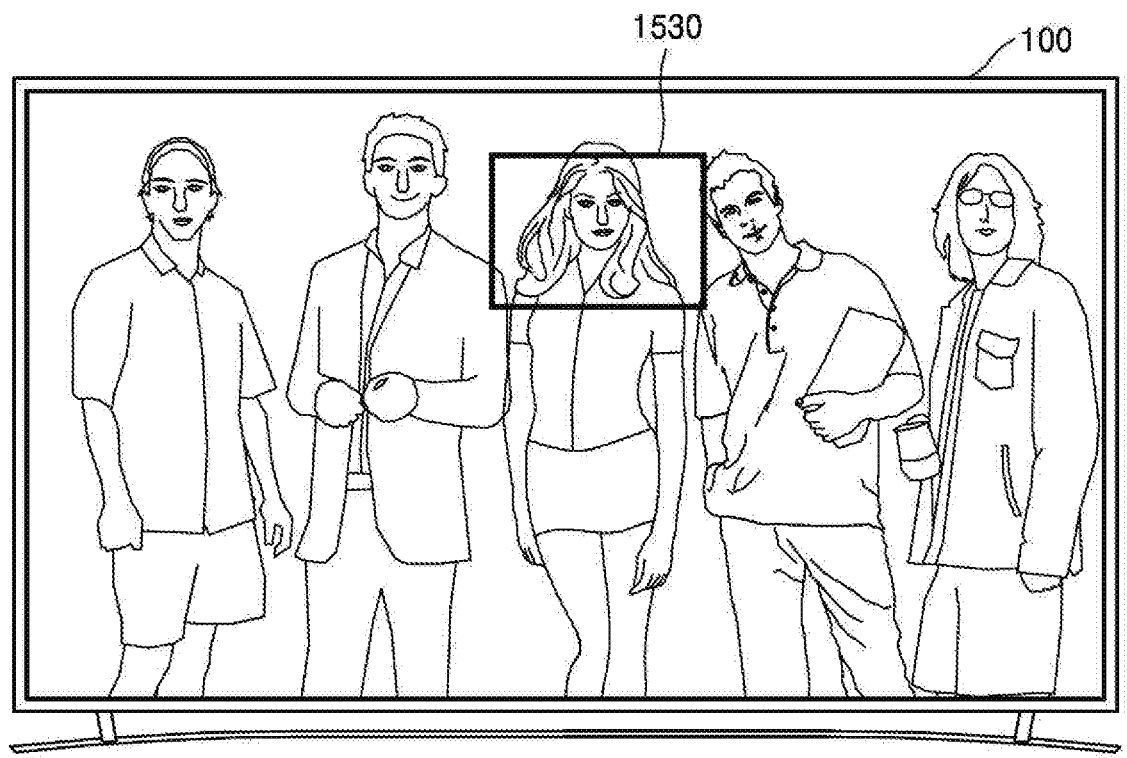
Figure 15C:
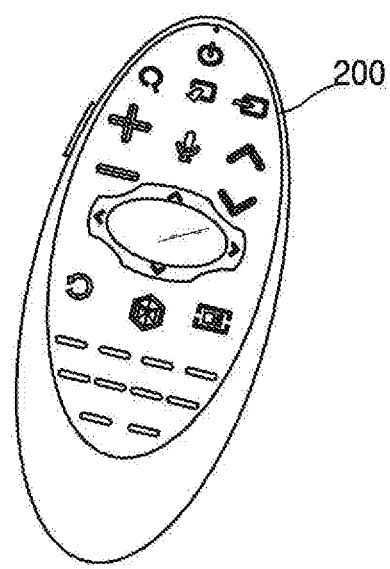

Referring to FIG. 15C, the image display device 100 may sense an input for manually selecting an object of interest in the first image. For example, the display 120 may display a rectangular box 1530 for selecting an object of interest in the first image. The user may move the rectangular box 1530 displayed in the display 120 to the region of an object of interest using the control device 200, and then select the object of interest by pushing a particular button. The image display device 100 may enlarge the selected object of interest and display the enlarged object of interest.

Figure 15D:
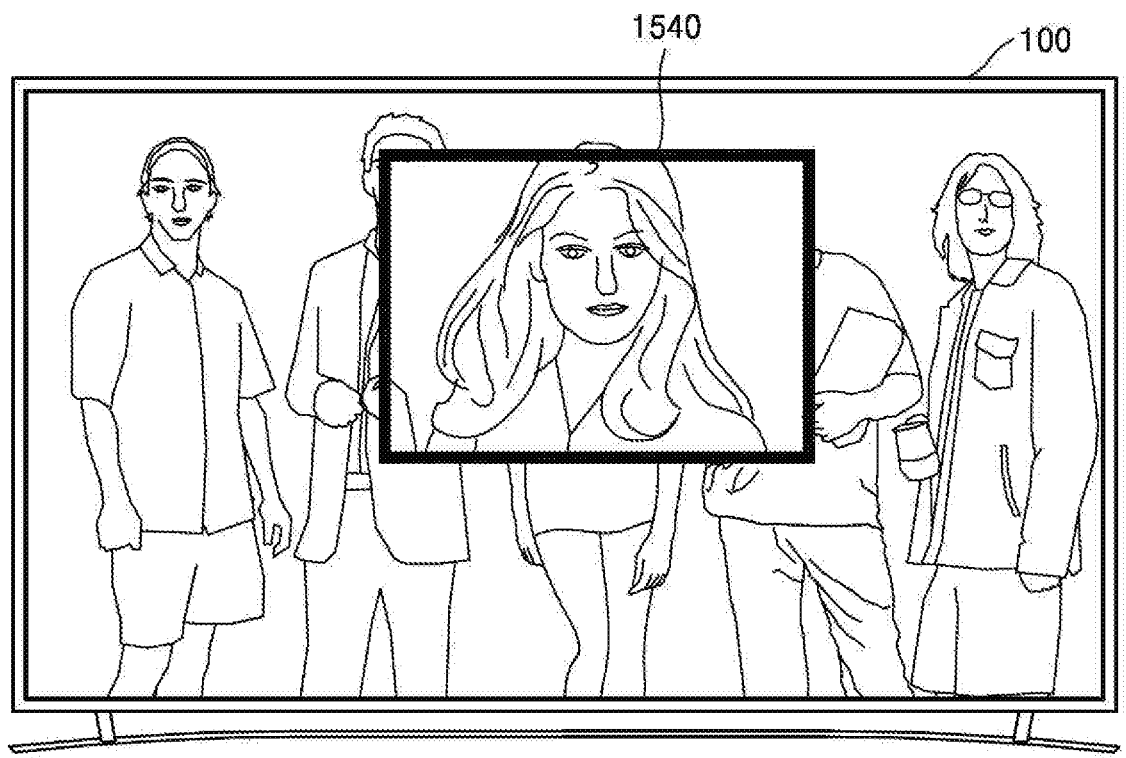
Figure 15D:
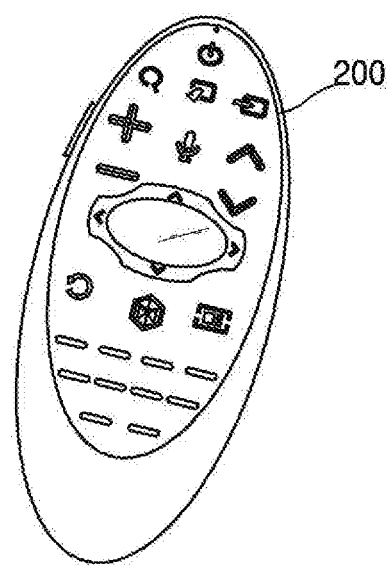

Referring to FIG. 15D, the image display device 100 according to an embodiment may automatically detect an object of interest in an image displayed in the display 120, enlarge the object of interest, and display the enlarged object of interest.

For example, when an object of interest is set among the objects included in the first image as described with reference to FIGS. 15A to 15C, the controller 110 may automatically detect the object of interest in an image which is currently displayed in the display 120 (referred to as "current image" below). When the object of interest is included in the current image, the controller 110 may enlarge the object of interest and display the enlarged object of interest in a zoom box 1540.

For example, when the image display device 100 plays a moving image, the display 120 may display frames included in the moving image, and the position of an object of interest may vary according to the frames. When the object of interest is displayed at different positions according to the frames, the image display device 100 may automatically detect the object of interest by tracking the position of the object of interest, enlarge the object of interest, and display the enlarged object in a zoom box.

In the first image, the zoom box 1540 may be displayed to overlap a region in which the object of interest is displayed. For example, when the position of an object of interest varies according to frames, the position of a zoom box may also vary according to movement of the object of interest. Also, the controller 110 may perform control so that the zoom box 1540 is displayed in a preset region, or may change the position at which the zoom box 1540 is displayed based on a user input. Further, the image display device 100 may adjust a magnification of the object of interest.

Figure 15E:
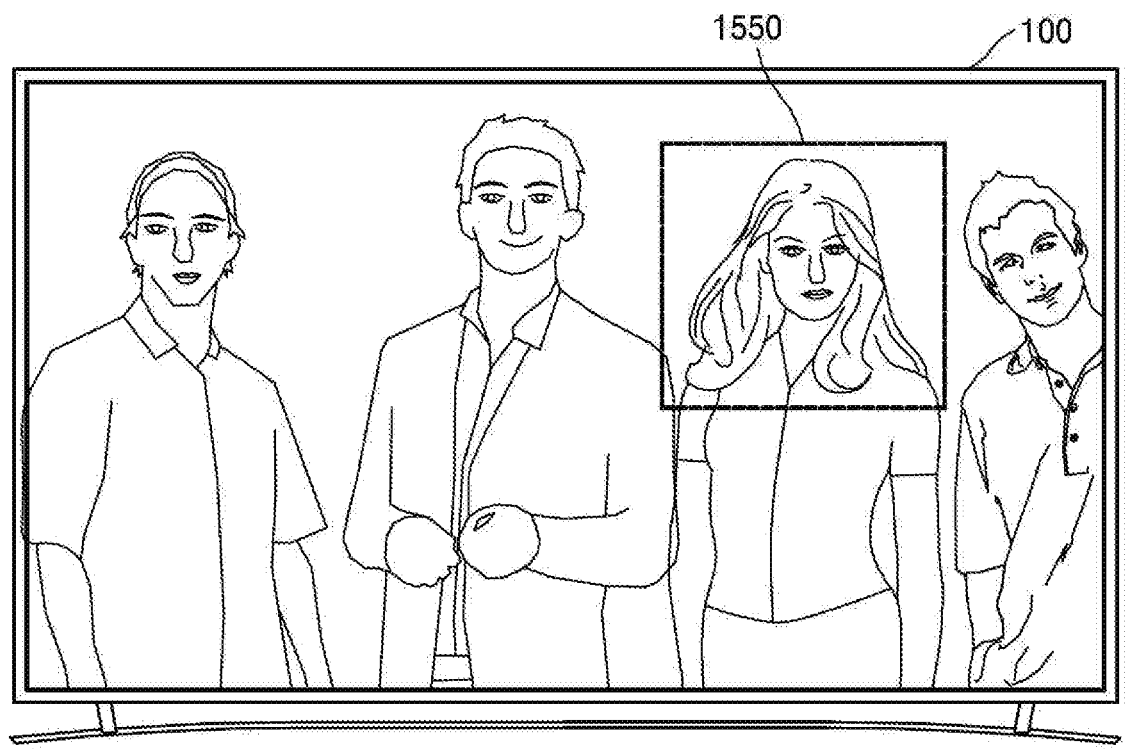
Figure 15E:
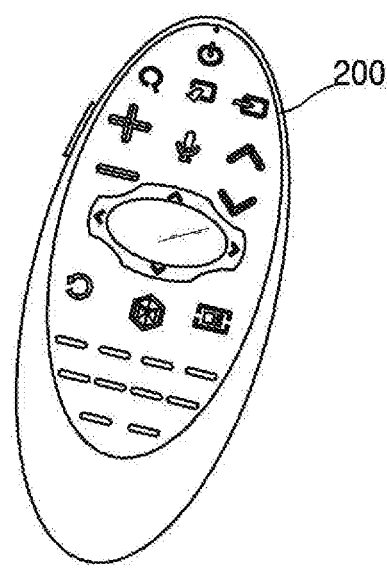

Referring to FIG. 15E, when the size of the object of interest displayed in a current image is equal to or larger than a first threshold value, the controller 110 according to an embodiment may not enlarge the object of interest. For example, the controller 110 may detect an object of interest 1550 in the current image, and calculate the size of the detected object of interest 1550. At this time, if the size of the object of interest 1550 is equal to or larger than the first threshold value, the controller 110 may perform control so that the zoom box is not displayed and only the current image is displayed.

For example, when a displayed object of interest is gradually increased in size, an enlarged object of interest may also be gradually increased in size, and when the size of the object of interest is equal to or larger than the first threshold value, the image display device 100 may not display the enlarged object of interest. Also, when the size of an object of interest is gradually reduced and becomes smaller than the first threshold value, the image display device 100 may display the enlarged object of interest again.

On the other hand, when the size of an object of interest displayed in a current image is smaller than a second threshold value (smaller than the first threshold value), the controller 110 according to an embodiment may increase a magnification of the object of interest.

When an input for finishing a zoom display is sensed, the controller 110 may perform control so that the zoom box is not displayed and only the current image is displayed.

Figure 16:
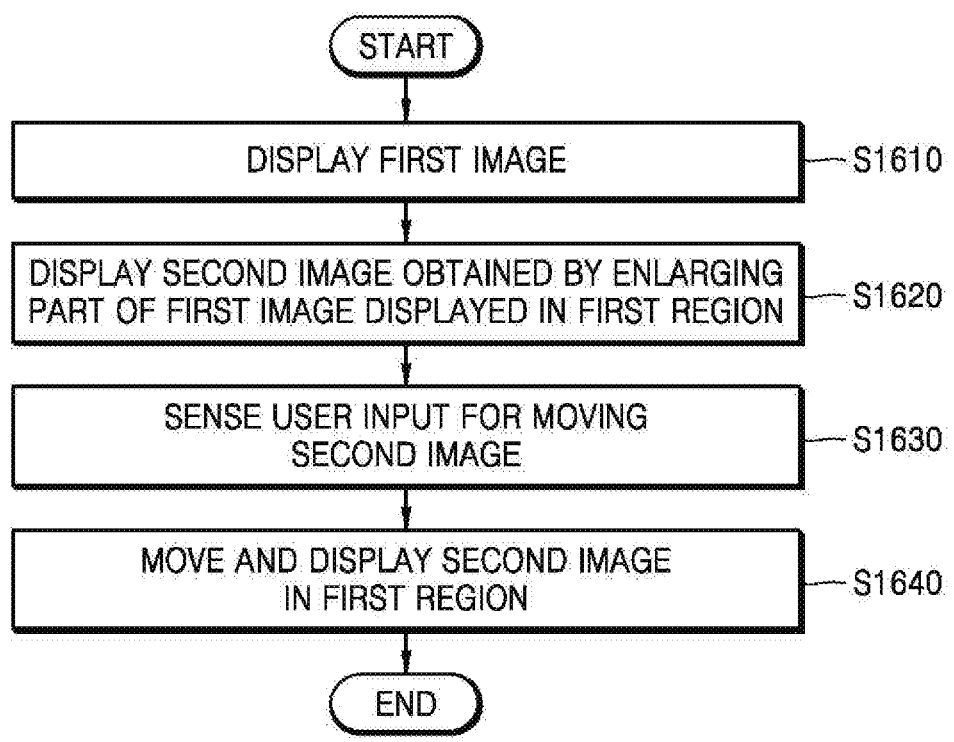
FIG. 16 is a flowchart illustrating an operating method of an image display device according to an embodiment of the present disclosure.

FIG. 16 is a flowchart illustrating an operating method of an image display device according to an embodiment of the present disclosure.

Referring to FIG. 16, the image display device 100 may display a first image at operation S1610.

The image display device 100 may generate a second image by enlarging a part of the first image displayed in a first region of the display 120, and display a part of the second image in the first region at operation S1620.

For example, the first region may be a region set as a zoom region. The first region may be a region set by a user input or a region in which an object of interest detected in the first image is displayed.

The image display device 100 may sense an input for enlargement, and generate the second image by enlarging the part of the first image displayed in the first region. Here, the second image is an image obtained by enlarging the part of the first image, and has a larger size than the part of the first image. Accordingly, the image display device 100 may display only a part of the second image in the first region.

Also, the image display device 100 may display an icon or a scroll bar which indicates a movable direction of the second image in the first region.

The image display device 100 may sense a user input for moving the second image at operation S1630, and may move the second image in the first region in response to the sensed user input and display the moved second image at operation S1640.

For example, when an input of any one of the four arrow keys included in the control device 200 is received, the image display device 100 may move the second image in a direction corresponding to the received arrow key input. However, movement of the second image is not limited thereto, and the second image may be moved using an input of rolling the scroll key upward or downward, an input of rolling the scroll key leftward or rightward, an input of dragging a scroll box, etc. in addition to inputs of the four arrow keys.

Also, the image display device 100 may sense an input for zooming in or out the second image, and zoom in the second image in response to the sensed zoom-in input or zoom out the second image in response to the sensed zoom-out input.

Figure 17:
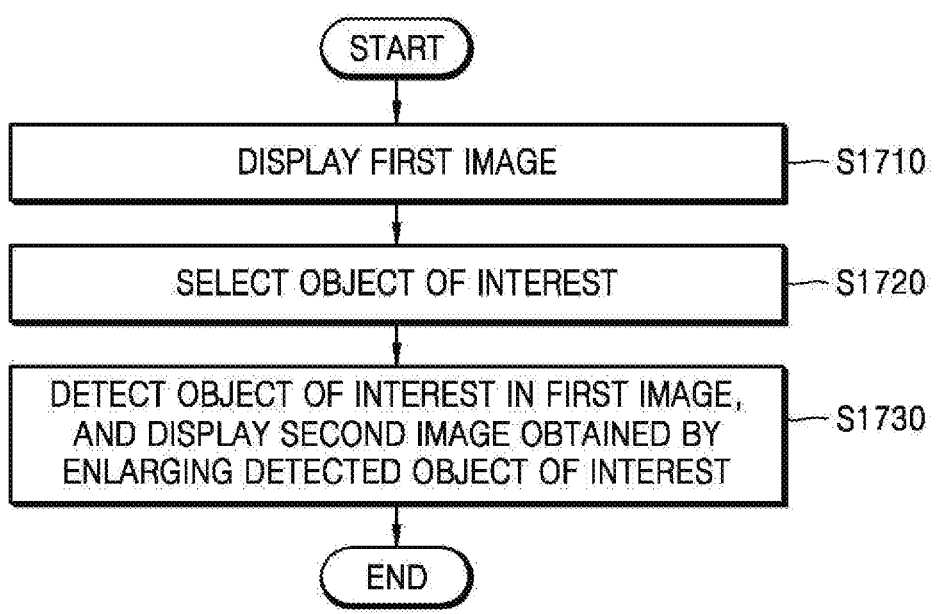
FIG. 17 is a flowchart illustrating an operating method of an image display device according to an embodiment of the present disclosure.

FIG. 17 is a flowchart illustrating an operating method of an image display device according to an embodiment of the present disclosure.

Referring to FIG. 17, the image display device 100 may display a first image including at least one object at operation S1710.

Also, the image display device 100 may detect the at least one object included in the first image and display the detected object. For example, the controller 110 may analyze the first image based on pixel values constituting the first image, brightness changes, extraction of feature points, and so on. The image display device 100 may detect objects, such as a human face, an animal face, a building, etc., in the first image through object recognition.

The image display device 100 may display a mark in the object detected in the first image or display a candidate list including the detected object.

The image display device 100 may sense a user input for selecting an object of interest among the at least one object at operation S1720.

The image display device 100 may detect the object of interest in the first image, and display a second image obtained by enlarging the detected object of interest at operation S1730.

For example, the image display device 100 may automatically detect the object of interest in an image currently displayed on the display 120 (current image). When the object of interest is included in the current image, the image display device 100 may enlarge the object of interest and display the enlarged object of interest in a zoom box. The zoom box may be displayed to overlap a region in the first image in which the object of interest is displayed. Alternatively, the image display device 100 may perform control so that the zoom box is displayed in a preset region, or change the position at which the zoom box is displayed based on a user input. The image display device 100 may also adjust a magnification of the object of interest.

When the size of the object of interest displayed in the current image is equal to or larger than a first threshold value, the image display device 100 according to an embodiment may not enlarge the object of interest. For example, the image display device 100 may detect the object of interest in the current image and calculate the size of the detected object of interest. At this time, if the size of the object of interest is equal to or larger than the first threshold value, the image display device 100 may perform control so that the zoom box is not displayed and only the current image is displayed.

On the other hand, when the size of the object of interest displayed in the current image is smaller than a second threshold value (smaller than the first threshold value), the image display device 100 may increase a magnification of the object of interest.

An operating method of an image display device according to an embodiment may be embodied in the form of program instructions executable through various computing tools (e.g., a processor, a controller, or a central processing unit), and recorded in a non-transitory computer-readable recording medium. The non-transitory computer-readable recording medium may include program instructions, data files, data structures, etc. solely or in combination. The program instructions recorded in the non-transitory computer-readable recording medium may be particularly designed or configured for the present disclosure or may be known to and used by those of ordinary skill in the computer software art. Examples of the non-transitory computer-readable recording medium include magnetic media, such as a hard disk, a floppy disk, and a magnetic tape, optical media, such as a compact disc (CD)-ROM and a digital versatile disc (DVD), magneto-optical media, such as a floptical disk, and hardware devices, such as a ROM, a RAM, and a flash memory, particularly configured to store and execute the program instructions. Examples of the program instructions include a high-end language code executable by a computer using an interpreter, etc. as well as a machine language code created by a compiler.

It should be understood that various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An image display device comprising:
a display configured to display a first image;
at least one processor configured to:
   generate a second image by enlarging a part of the first image, wherein the enlarged part of the first image corresponds to the part of the first image that is displayed in a first region of the display,
   determine a first location of the first region according to one of a user selection or detecting of an object,
   determine a second location of a second region of the display according to the first location and different from the first location, and
   control the display to display a part of the second image in the second region; and a sensor configured to sense a user input for moving the second image, wherein, in response to the user input, the at least one processor is further configured to control the display to change the displayed part of the second image in the second region according to the user input, wherein the second region is fixed at the second location on the display while the second image displayed in the second region moves in the second region according to the user input without regard to a portion of the first image at the second location, wherein the changed part of the second image is related to a location of the display according to the user input, and wherein the determining of the second location is determined according to an equation $$q = t + 1/10 \sin\pi t,$$

where t represents the first location and q represents the second location.

2. The image display device of claim 1,
wherein the sensor is further configured to sense a directional key input, and
wherein the at least one processor is further configured to control so that the second image is moved in the second region in a direction corresponding to the sensed directional key input.

3. The image display device of claim 1, wherein the display is further configured to display an icon representing a movable direction of the second image.

4. The image display device of claim 1,
wherein the sensor is further configured to sense an input for zooming in or out the second image, and
wherein the at least one processor is further configured to:
zoom in the second image in response to a sensed zoom-in input, or
zoom out the second image in response to a sensed zoom-out input.

5. The image display device of claim 1, wherein the at least one processor is further configured to:
detect an object of interest in the first image, and
set a region in which the detected object of interest is displayed as the first region.

6. The image display device of claim 5, wherein the at least one processor is further configured to:
detect text in the first image, and
set a region in which the text is displayed as the first region.

7. The image display device of claim 1, wherein at least one of the first region or the second region is determined based on a user input for determining the at least one of the first region or the second region.

8. An operating method of an image display device, the operating method comprising:
displaying a first image on a display;
generating a second image by enlarging a part of the first image, wherein the enlarged part of the first image corresponds to the part of the first image that is displayed in a first region of the display;
determining a first location of the first region according to one of a user selection or detecting of an object;
determining a second location of a second region of the display according to the first location and different from the first location;
displaying a part of the second image in the second region;
sensing a user input for moving the second image; and
changing the displayed part of the second image in the second region, according to the user input,
wherein the second region is fixed at the second location on the display while the second image displayed in the second region moves in the second region according to the user input without regard to a portion of the first image at the second location,
wherein the changed part of the second image is related to a location of the display according to the user input, and
wherein the determining of the second location is determined according to an equation $$q = t + 1/10 \sin\pi t,$$

where t represents the first location and q represents the second location.

9. The operating method of claim 8,
wherein the sensing of the user input comprises sensing a directional key input, and
wherein the moving and displaying of the second image comprises moving the second image in the second region in a direction corresponding to the sensed directional key input.

10. The operating method of claim 8, further comprising displaying an icon representing a movable direction of the second image.

11. The operating method of claim 8, further comprising:
sensing an input for zooming in or out the second image; and
zooming in the second image in response to a sensed zoom-in input, or zooming out the second image in response to a sensed zoom-out input.

12. The operating method of claim 8, further comprising:
detecting an object of interest in the first image; and
setting a region in which the detected object of interest is displayed as the first region.

13. The operating method of claim 12, wherein the detecting of the object of interest in the first image and the setting of the region in which the detected object of interest is displayed as the first region comprises:
detecting text in the first image; and
setting a region in which the text is displayed as the first region.

14. The operating method of claim 8, wherein at least one of the first region or the second region is determined based on a user input for determining the at least one of the first region or the second region.

15. A non-transitory computer readable recording medium configured to store program instructions, that when executed by at least one processor of an image display device, cause the at least one processor to control the image display device perform the operating method of claim 8.

* * * * *